US009552292B2

(12) United States Patent
Ooba et al.

(10) Patent No.: US 9,552,292 B2
(45) Date of Patent: Jan. 24, 2017

(54) APPARATUS AND METHOD FOR ALLOCATING VIRTUAL MEMORY ADDRESSES TO CONTINUOUS PHYSICAL ADDRESSES

(71) Applicant: FUJITSU LIMITED, Kawasaki-shi, Kanagawa (JP)

(72) Inventors: Fumihiro Ooba, Hakusan (JP); Shuko Yasumoto, Kanazawa (JP); Hisashi Osanai, Kanazawa (JP); Shunsuke Motoi, Nonoichi (JP); Daisuke Fujita, Kanazawa (JP); Tetsuya Nakashima, Nonoichi (JP); Eiji Hamamoto, Kanazawa (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/718,471

(22) Filed: May 21, 2015

(65) Prior Publication Data

US 2015/0378933 A1 Dec. 31, 2015

(30) Foreign Application Priority Data

Jun. 27, 2014 (JP) ................. 2014-132287

(51) Int. Cl.
*G06F 12/10* (2016.01)
*G06F 12/06* (2006.01)
*G06F 9/50* (2006.01)

(52) U.S. Cl.
CPC ....... *G06F 12/0653* (2013.01); *G06F 12/1027* (2013.01); *G06F 9/5061* (2013.01); *G06F 9/5077* (2013.01)

(58) Field of Classification Search
CPC .. G06F 12/1009; G06F 12/1027; G06F 12/10; G06F 9/5061; G06F 9/5077
USPC ..................... 711/203, 206, 6, 170
See application file for complete search history.

(56) References Cited

U.S. PATENT DOCUMENTS

| 2004/0064671 | A1* | 4/2004 | Patil ............................. 711/203 |
| 2005/0055603 | A1  | 3/2005 | Soran et al. |
| 2006/0294334 | A1* | 12/2006 | Jann et al. .................... 711/170 |
| 2007/0033318 | A1* | 2/2007 | Gilday et al. .................... 711/3 |
| 2008/0059662 | A1  | 3/2008 | Iwahashi et al. |
| 2009/0119450 | A1  | 5/2009 | Saeki et al. |
| 2011/0191537 | A1  | 8/2011 | Kawaguchi et al. |

(Continued)

FOREIGN PATENT DOCUMENTS

| JP | 2007-502470 | 2/2007 |
| JP | 2008-065434 | 3/2008 |

(Continued)

*Primary Examiner* — Than Nguyen
(74) *Attorney, Agent, or Firm* — Fujitsu Patent Center

(57) ABSTRACT

A storage management apparatus configured to allocate physical addresses in a physical storage area, to virtual addresses in a virtual storage area for storing data is provided. The storage management apparatus includes a processor that executes a process to define, in the physical area, a continuous area having a plurality of continuous physical addresses, and define, based on a virtual address to which a physical address in the continuous area has initially been allocated, an allocation range of virtual addresses for allocating the defined continuous area; and allocate a physical address in the defined continuous area to a virtual address in the defined relation range.

20 Claims, 31 Drawing Sheets

(56) References Cited

U.S. PATENT DOCUMENTS

| | | | |
|---|---|---|---|
| 2014/0149652 A1* | 5/2014 | Park et al. | 711/105 |
| 2014/0281366 A1* | 9/2014 | Felch | 711/207 |
| 2015/0301952 A1* | 10/2015 | McKinley | 711/207 |

FOREIGN PATENT DOCUMENTS

| | | |
|---|---|---|
| JP | 2009-116601 | 5/2009 |
| JP | 2010-086420 | 4/2010 |
| JP | 2011-076572 | 4/2011 |
| JP | 2012-531653 | 12/2012 |
| WO | 2005/017737 | 2/2005 |
| WO | 2011/042940 | 4/2011 |

\* cited by examiner

UPON FIRST WRITES THAT ARE RANDOM WRITES (1/2)

FIG. 10

CASE WHERE TWO POOLS FALL WITHIN SELECTION RANGE

| | START ADDRESS | END ADDRESS | SELECTION RANGE (THRESHOLD: 20) | DISPLACEMENT FROM VIRTUAL ADDRESS |
|---|---|---|---|---|
| POOL 1 | 30 | 50 | 10~70 | 65-50=15 |
| POOL 2 | 70 | 120 | 50~140 | 70-65=5 ← SELECTED |

FIG. 14

CASE WHERE SELECTION RANGE IS FIXED

|  | START ADDRESS | END ADDRESS | SELECTION RANGE (THRESHOLD: 20) |
|---|---|---|---|
| POOL 1 | 0 | 50 | 0~70 |
| POOL 2 | 100 | 150 | 80~170 |

FIG. 17 UPON FIRST WRITES THAT ARE RANDOM WRITES

HOW SNAPSHOT AREAS ARE MANAGED
(WITH COMPLEMENT)

FIG. 29 HOW SNAPSHOT AREAS ARE MANAGED

HOW SNAPSHOT AREAS ARE MANAGED
(UPON SECOND AND SUBSEQUENT WRITES)

APPARATUS AND METHOD FOR ALLOCATING VIRTUAL MEMORY ADDRESSES TO CONTINUOUS PHYSICAL ADDRESSES

CROSS-REFERENCE TO RELATED APPLICATION

This application is based upon and claims the benefit of priority of the prior Japanese Patent Application No. 2014-132287, filed on Jun. 27, 2014, the entire contents of which are incorporated herein by reference.

FIELD

The present disclosure relates to a storage management apparatus, a computer-readable recording medium having stored therein a storage management program, and a control method.

BACKGROUND

Virtual storage apparatuses are well known, in which virtual storing devices (hereinafter also referred to as "virtual disks (VDISKs)") are provided using physical storing devices, such as hard disk drives (HDDs), for flexibly allocating storage areas to users of the storing devices (see Patent Documents 1-6, for example).

In a virtual storage apparatus, a business server, which represents one example of a higher-level apparatus, may obtain a snapshot of data on a VDISK (differential copy). As in the example in FIG. 29 that depicts how areas of a snapshot are managed, after a snapshot is generated, differential data that represents changes in data after the snapshot was stored in a working VDISK, and the data before the snapshot was obtained, is read from a master VDISK. A write to the working VDISK for the snapshot constitutes differential data, and is handled as a bundle of data (hereinafter, referred to as chunk) by an management server for the virtual storage apparatus.

A chunk is a logical block in the smallest unit in a certain size, and is obtained in a free area in the working VDISK. Chunks are arranged sequentially in a physical storing device in the order of the indices of the chunks (in the order of the time when input/outputs (I/Os) are received). The indices of the chunkmatch the physical addresses in the physical storing device.

As in the example in FIG. 30, when an initial write (first write) I/O is made to an offset (virtual address) where no differential data to the working VDISK has been created, the management server obtains a fresh chunk, and writes data into the obtained chunk. In the example in FIG. 30, the management server obtains a chunk of an index value (index, physical address) of "0x003" for a write I/O to an offset of "7" where no differential data to the working VDISK is present, and writes data into the obtained chunk. The management server then registers the offset (virtual address) and the obtained chunk location (physical address), to a V-R map that indicates the relations between virtual addresses and physical addresses.

In contrast, as in the example in FIG. 31, when a write (second or subsequent write) I/O is made to an offset where differential data has been created, the management server obtains the chunk that has been allocated to (associated with) the write address (virtual address), and writes data into the obtained chunk. In the example in FIG. 31, the management server obtains, from the V-R map, the chunk of an index of "0x002" where differential data has been stored, for a write I/O to an offset of "3" where the differential data is present in working VDISK, and writes (overwrites) data into the obtained chunk.

A snapshot can reduce the I/O load on the business server, by means of such a differential copy.

Patent Document 1: Japanese National Publication of International Patent Application No. 2012-531653
Patent Document 2: Japanese Laid-open Patent Publication No. 2011-76572
Patent Document 3: Japanese Laid-open Patent Publication No. 2010-86420
Patent Document 4: Japanese National Publication of International Patent Application No. 2007-502470
Patent Document 5: Japanese Laid-open Patent Publication No. 2009-116601
Patent Document 6: Japanese Laid-open Patent Publication No. 2008-65434

In the working VDISK storing differential data, virtual addresses for first writes are randomly allocated to physical addresses, and thus the data read performance (access performance) from the working VDISK may deteriorate.

Note that the above-identified issue is not limited to a snapshot where a differential copy is created, and the read performance from a virtual storing device may also be deteriorated when virtual addresses are allocated to physical addresses sequentially in the order of the time when I/Os are received.

SUMMARY

In an aspect of the present disclosure, a storage management apparatus configured to allocate physical addresses in a physical storage area, to virtual addresses in a virtual storage area for storing data is provided. The storage management apparatus includes a processor that executes a process to define, in the physical area, a continuous area having a plurality of continuous physical addresses, and define, based on a virtual address to which a physical address in the continuous area has initially been allocated, an allocation range of virtual addresses for allocating the defined continuous area; and allocate a physical address in the defined continuous area, to a virtual address in the defined allocation range.

The object and advantages of the invention will be realized and attained by means of the elements and combinations particularly pointed out in the claims.

It is to be understood that both the foregoing general description and the following detailed description are example and explanatory and are not restrictive of the invention, as claimed.

BRIEF DESCRIPTION OF DRAWINGS

FIG. 10 is a diagram illustrating an example where a virtual address falls within two pool selection ranges;

FIG. 14 is a diagram illustrating a pool selection range according to the first modification to the first embodiment;

DESCRIPTION OF EMBODIMENTS

Figure 1:
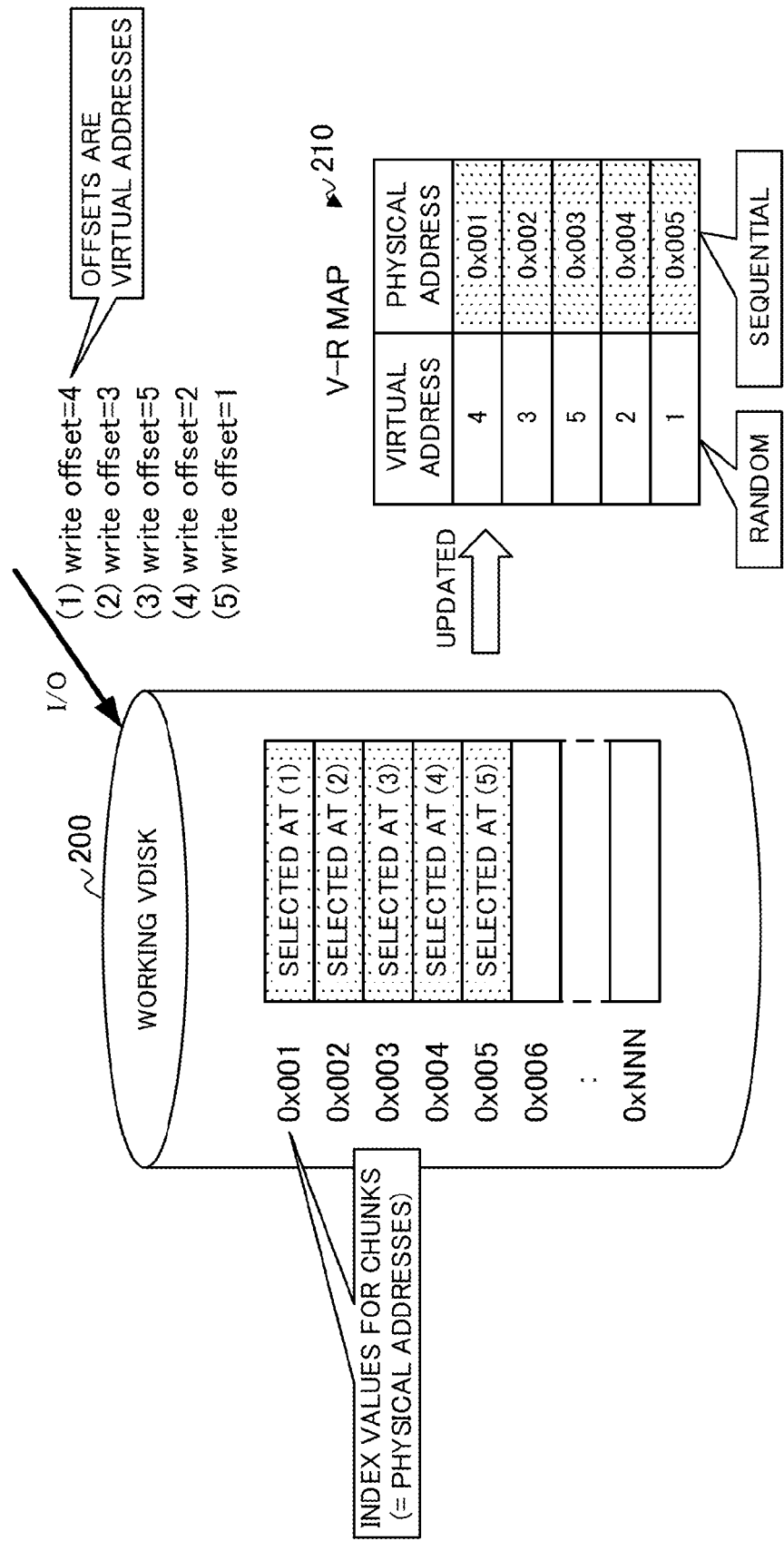
FIG. 1 is a diagram illustrating an example where first writes of a snapshot into a working VDISK are random writes.

Hereinafter, embodiments of the present disclosure will be described with reference to the drawings. Note that the embodiments discussed herein are merely exemplary, and it is not intended that various modifications and applications of the techniques not explicitly described are not omitted. In other words, the embodiments may be modified, within the scope of the spirit of the embodiments. Unless otherwise noted, elements denoted by the same reference numerals denote the same or similar elements throughout the drawings illustrating the embodiments described below.

(1) Read from Virtual Storage Apparatus

As described above, when first writes of a snapshot into a working VDISK are random writes, a virtual storage apparatus uses free chunks in the order of their indices (in other words, in the order of writes of virtual addresses). Hence, as in the example in FIG. 1, a V-R map 210 is a map of allocations (relations) between random virtual addresses in a working VDISK 200 and sequential physical addresses. In the example in FIG. 1, when random writes with offsets "4", "3", "5", "2", and "1" are made in this order, the physical addresses "0x001" to "0x005" are allocated sequentially to (associated sequentially with) these virtual addresses.

Figure 2:
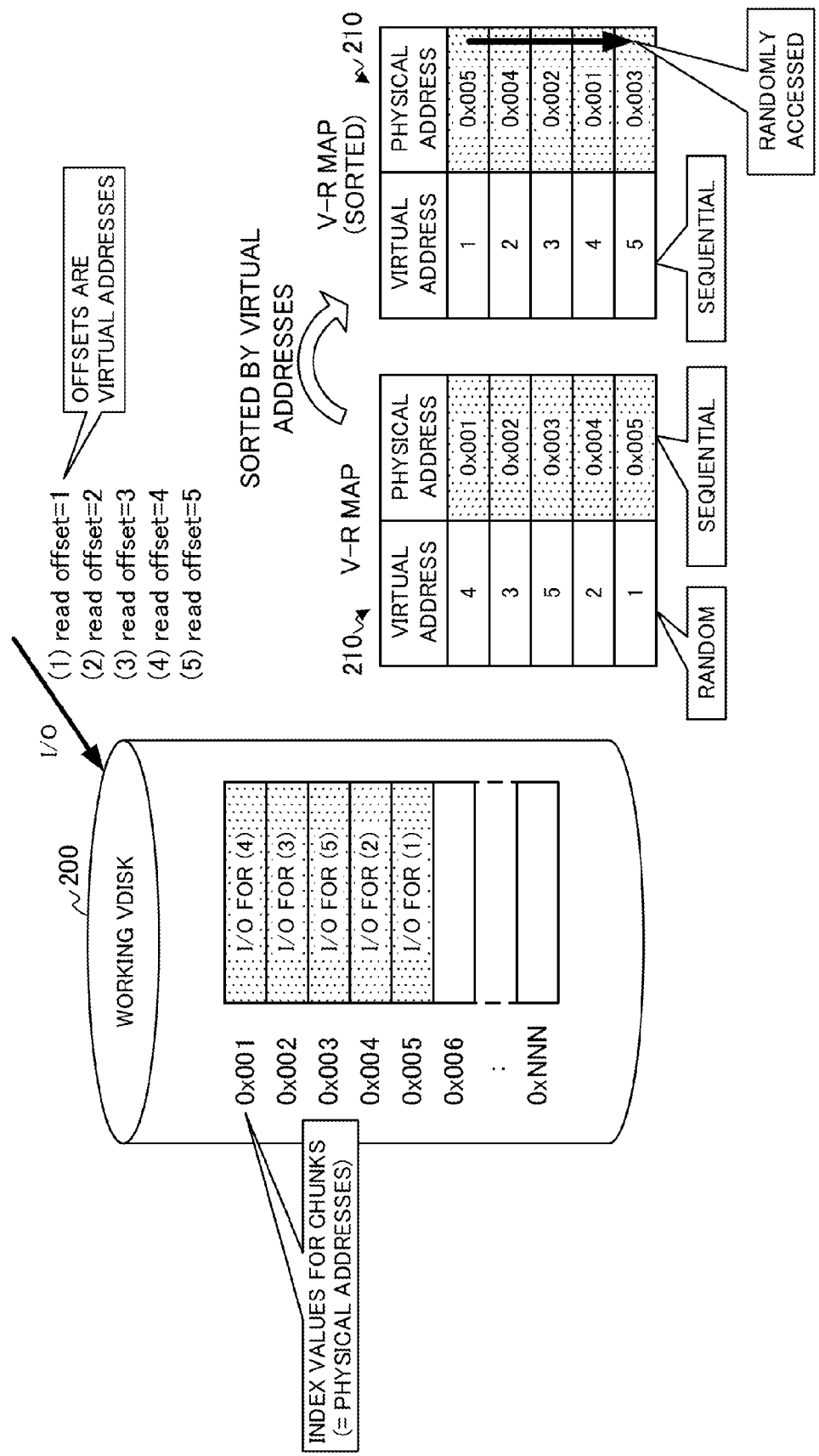
FIG. 2 is a diagram illustrating an example where sequential read I/Os are made in FIG. 1.

After random writes depicted in FIG. 1 are made, as in the example in FIG. 2, sequential read I/Os are made to the virtual addresses to which the writes have been made. In the example in FIG. 2, sequential read I/Os with offsets of "1" to "5" are made.

In this case, as depicted in the V-R map 210 after sorting chunks by their virtual addresses, the chunks are physically discontinued. In other words, for sequential virtual addresses, physical addresses are located randomly. As a result, sequential reads I/O from a business server are handled as random access I/Os to a physical storing device (hereinafter, simply referred to as "storing device"), inside the management server.

In accesses to the storing device, sequential read I/Os that read physical addresses in sequence may be regarded as accesses exhibiting the best I/O performance since the movements of the magnetic head in the storing device are made smaller, thereby reducing the seek time. However, when sequential read I/Os are made to the areas where the business server writes after random write I/Os to the virtual storage device, the sequential read I/Os are handled as random access I/Os to the storing device, as described above, which deteriorates the access performance.

One situation where such an access performance deterioration may be caused, is the case where multiple hosts, such as an operating system (OS) or a virtual OS, are running on the business server, and first writes to the same virtual storing device are made from these hosts simultaneously. In such a case, even if each host issues a write I/O to the virtual storing device separately, the I/Os are received by the management server in sequence and physical address are allocated to virtual addresses.

For example, first write I/Os with offsets of "1" to "5" are issued by Host A, and at the same time, different first write I/Os with offsets of "11" to "15" are issued by Host B. In this case, the management server allocates chunks sequentially in the order of arrival of I/Os, such as I/Os with offsets of "1", "11", "2", "12", . . . , "5", and "15", and sequential physical addresses are allocated to such random virtual addresses.

Conventionally, snapshot is generally considered as a technique for keeping differential data for the purpose of saving the disk space of a storing device, and some deterioration of I/O performance is allowed. Further, since only a limited number of applications execute sequential read I/Os after random write I/Os to a virtual storing device, such deterioration of the performance is not noticed remarkably.

Here, a storage system in present embodiments, which reduces an access performance deterioration, in light of the above-described situation, will be described in detail.

(2) First Embodiment

Hereinafter, a storage system according to a first embodiment will be described. As an example in, a situation where a snapshot is made in a storage system (virtual storage apparatus) and differential copies are created in the unit of chunks, will be described.

A storage system according to the first embodiment can control such that, in a snapshot, even if first writes are random write I/Os, pieces of differential data are continuously arranged for sequential virtual addresses in a storing device. As a result, even when sequential read I/Os are performed after the writes, an management server can issue I/Os sequentially to the storing device, which helps to improve the performance of sequential read I/Os.

(2-1) Example Configuration of Storage System

Figure 3:
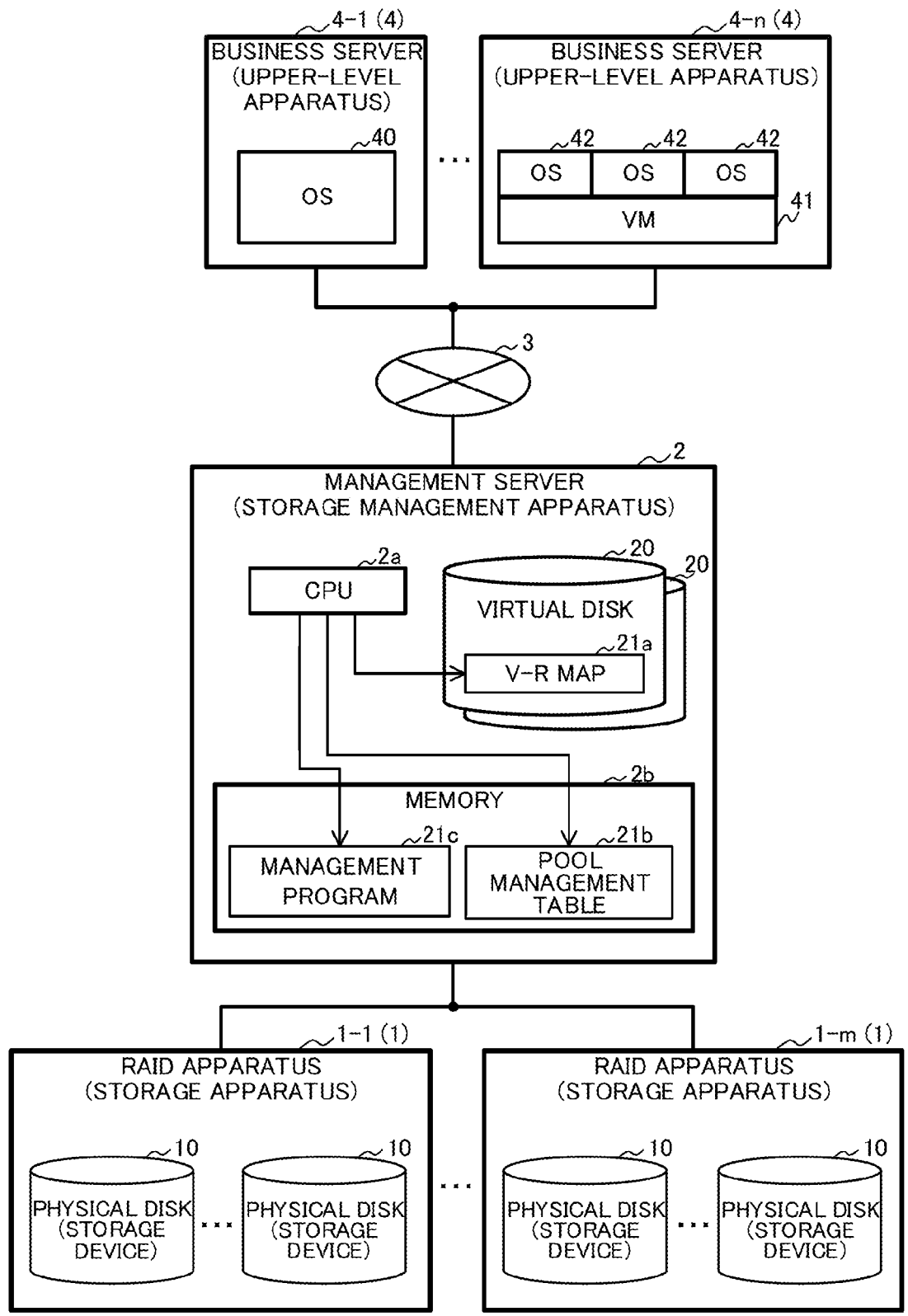
FIG. 3 is a diagram illustrating an example configuration of a storage system according to a first embodiment.

FIG. 3 is a diagram illustrating an example configuration of the storage system according to the first embodiment. The storage system according to the first embodiment may exemplarily include redundant arrays of inexpensive disks (RAID) apparatuses 1-1 to 1-$m$, an management server 2, a network 3, and business servers 4-1 to 4-$n$, as hardware, where each of m and n are integers of 2 or greater. The hardware provided in this storage system may be located in a data center, for example, or at least part of the hardware may be located in a different facility and communications within the system may be made through a network.

Each of the RAID apparatuses 1-1 to 1-$m$ (hereinafter, they are simply referred to as the RAID apparatuses 1 when no distinction among them is made) includes one or more (multiple, in the example in FIG. 3) physical disks 10, and represents one example of a storage apparatus. The physical disks 10 are hardware, and store various types of data and programs, as virtual storing devices. The physical disks 10 may be magnetic disk devices, such as HDDs, solid state drive devices, such as solid state drives (SSDs), and non-volatile memories, such as flush memories, for example. The physical disks 10 represent examples of physical storing devices (may also be referred to storing devices).

The business servers 4-1 to 4-$n$ (hereinafter, they are simply referred to as the business servers 4 when no distinction among them is made) represent one example of a terminal (higher-level apparatus) used by uses of the virtual storage apparatus. The business servers 4 can make various types of accesses (I/Os) to the virtual storage apparatus via the network 3, by an OS 40 or a virtual OS 42 running on a virtual machine (VM) 41, for example.

The OSs 40 and 42 can execute, as hosts, a snapshot by a differential copy, on virtual disks 20 provided by the virtual storage apparatus. Note that the OSs 40 and 42 may divide a virtual disk 20 provided by the virtual storage apparatus into multiple virtual disks 20, or may create partitions.

The network 3 may include the Internet or an intranet, or a combination thereof. Note that the business servers 4 may also be connected to the management server 2, without being connected to the network 3, and the user may access to the business servers 4 via a network, by using a terminal.

The management server 2 can configure the virtual disks 20 from the physical disks 10 in the RAID apparatuses 1, and provides the business servers 4 (the OSs 40 and 42) with the virtual disks 20. In response to accesses (I/Os) from the business servers 4 to the virtual disks 20, the management server 2 allocates physical addresses in a physical storage area where the data is to be stored, to virtual addresses in a virtual storage area where data is to be stored.

In this manner, the management server 2 represents one example of an management apparatus, such as a logical volume manager, that provides the business servers 4 (the OSs 40 and 42) with the virtual disks 20. The RAID apparatuses 1 and the management server 2 may be regarded as a virtual storage apparatus.

(2-2) Example Configuration of Management Server

As depicted in FIG. 3, the management server 2 may exemplarily include one or more (two, in FIG. 3) virtual disks 20, a central processing unit (CPU) 2$a$, and a memory 2$b$.

The CPU 2$a$ represents one example of an information processing unit (processor) that performs various types of controls and computations. The CPU 2$a$ can embody functions of the management server 2 (see FIG. 4), by executing an management program 21$c$ stored in the memory 2$b$.

The memory 2$b$ is a storage unit that stores various types of data and programs. When a program is executed, the CPU 2$a$ stores and retains data and programs in the memory 2$b$. The memory 2$b$ can retain a pool management table 21$b$ (described later) and the above-described management program 21$c$. Note that the memory 2$b$ may be a volatile memory, such as a random access memories (RAM), for example.

The virtual disk 20 is a storage area virtually configured (defined) by the CPU 2$a$. The virtual disks 20 may include a V-R map 21$a$ (see FIG. 7) that indicates the relations (associations) between virtual addresses in a virtual area (virtual storing device) and physical addresses in a physical area (physical storing device). Note that the V-R map 21$a$ may be stored in the memory 2$b$, or a single V-R map 21$a$ may be maintained for all of the virtual disks 20, rather than a single V-R map 21$a$ is maintained for each virtual disk 20.

In the example depicted in FIG. 3, the management server 2 includes two virtual disks 20, namely, one master VDISK and one working VDISK. Note that the management server 2 may provide a single virtual disk 20, and the master VDISK and the working VDISK may be created (defined) by the business servers 4 (the OSs 40 and 42) by dividing or partitioning that single virtual disk 20.

Figure 4:
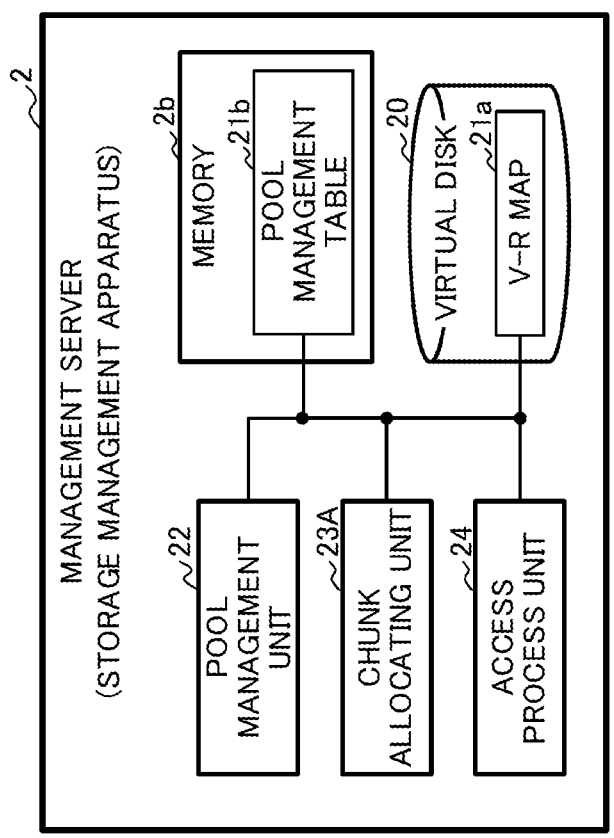
FIG. 4 is a diagram illustrating an example functional configuration of management server as an example of the first embodiment.

FIG. 4 is a diagram illustrating an example functional configuration of the management server 2 as an example of the first embodiment. The management server 2 may exemplarily include a pool management unit 22, a chunk allocating unit 23A, and an access process unit 24. Hereinafter, processing subsequent to receiving write I/Os in the management server 2 will be described. Handling of read I/Os and other functions of the management server can be achieved by well-known techniques, and detailed description thereof is omitted.

The pool management unit 22 manages pools 20b, which are collections (groups) of multiple chunks. For example, the pool management unit 22 can divide continuous free areas (may also be referred to continuous areas) in a physical disk 10 into multiple pools 20b, and manages a start address and an end address of each pool 20b.

Figure 5:
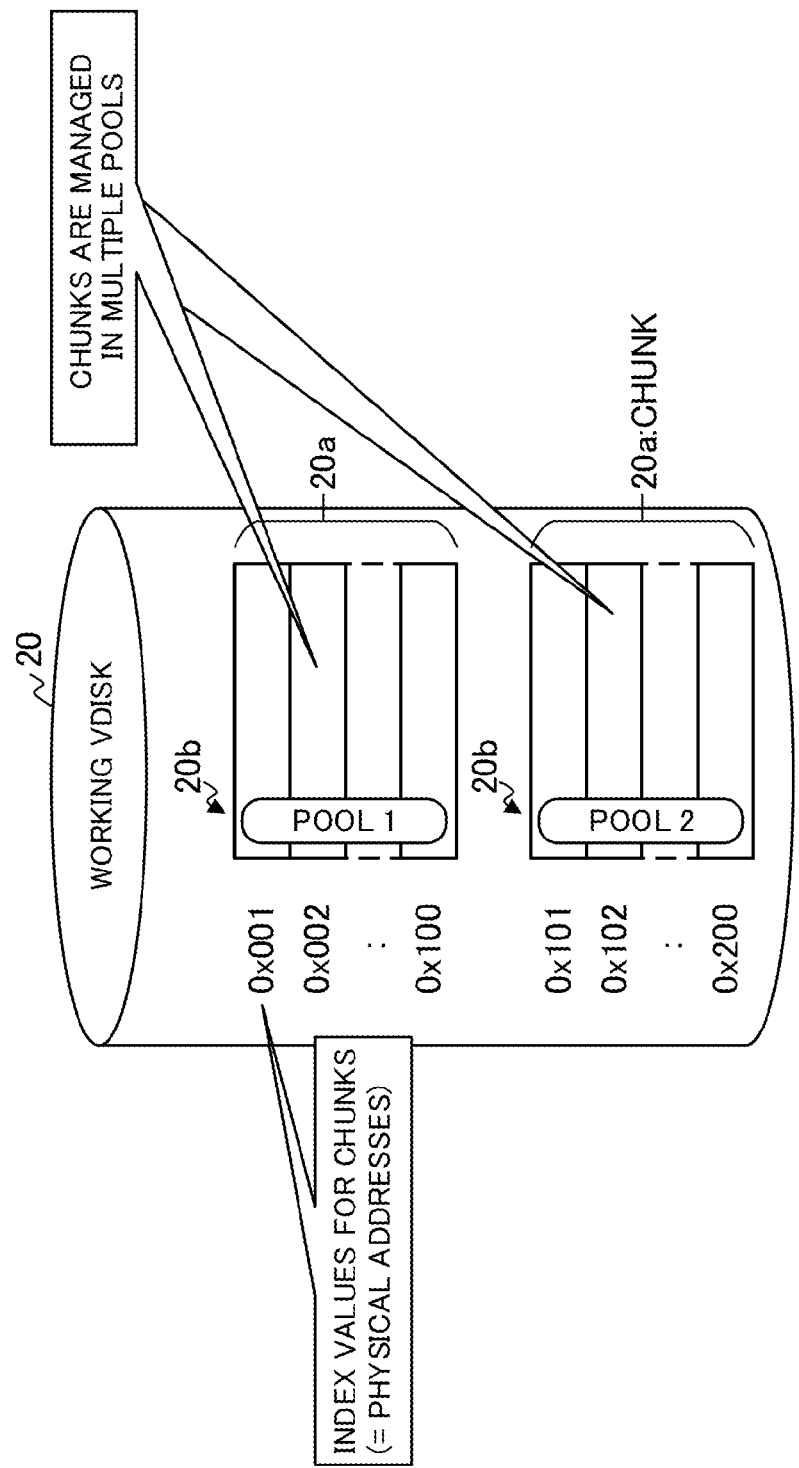
FIG. 5 is a diagram illustrating an example of how areas of a snapshot are administered, according to the first embodiment.

FIG. 5 illustrates an example of how areas of a snapshot are managed, according to the first embodiment. For example, the pool management unit 22 can manage, multiple (100, in FIG. 5) chunks 20a as a single pool 20b, as depicted in FIG. 5. Note that each chunk 20a may have any size, such as a size of about one megabyte (MB), for example. Each pool 20b may include any number of chunks 20a.

The pool management unit 22 can create multiple temporary pools 20b including a certain number of chunks 20a. In this case, the pool management unit 22 may temporarily set a range (for example, start address and end address) of virtual addresses allocated to (associated with) chunks 20a in each pool 20b.

In the example in FIG. 5, the pool management unit 22 may form one pool 20b into chunks 20a of indices (physical addresses) from "0x001" to "0x100", and another pool 20b into chunks 20a of indices (physical addresses) from "0x101" to "0x200". Hereinafter, the pool 20b of indices (physical addresses) from "0x001" to "0x100" may be referred to as Pool 1, while the pool 20b of indices (physical addresses) from "0x101" to "0x200" may be referred to as Pool 2.

For managing the pools 20b, the pool management unit 22 may generate and update a pool management table 21b that maintains mapping information between the virtual disks 20 and the physical disks 10 in the memory 2b. An example of the pool management table 21b is depicted in FIG. 6.

Figure 6:
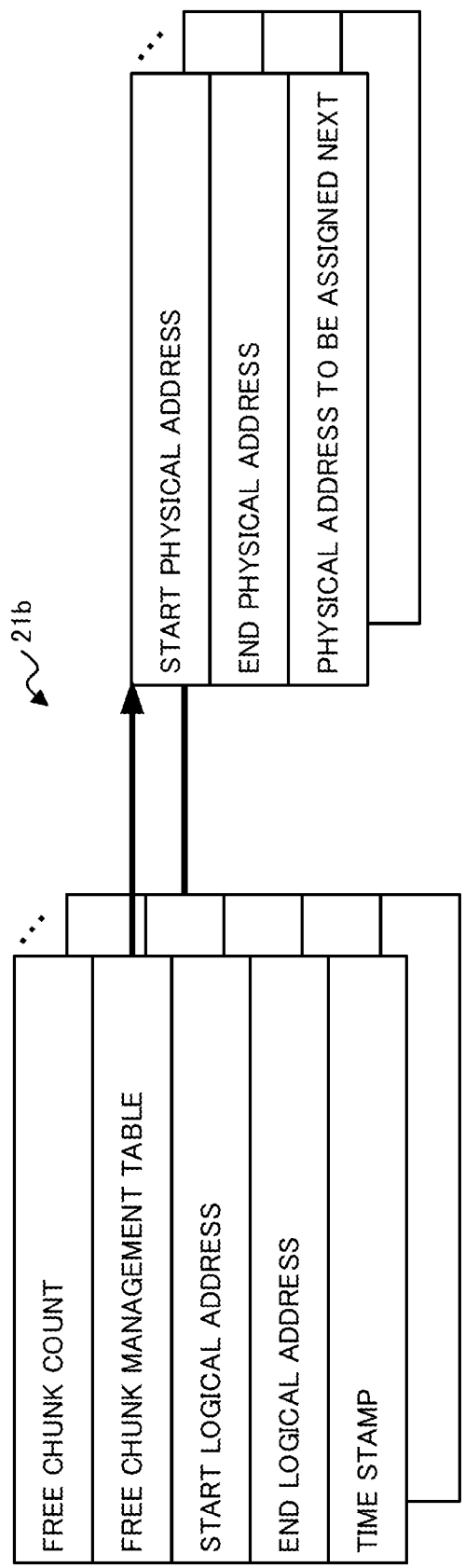
FIG. 6 is a diagram illustrating an example of a pool management table depicted in FIG. 4.

As in the example in FIG. 6, the pool management table 21b may include, for each pool 20b, a free chunk count, a free chunk management table, a start logical address, an end logical address, and a time stamp. The free chunk count indicates the number of unallocated chunks 20a in that pool 20b, in other words, the number of chunks 20a which have not been associated with virtual addresses yet, and is updated (subtraction) in response to one unallocated chunk 20a is allocated to (associated with) a virtual address.

The free chunk management table contains information on the storage areas in the physical disk 10 corresponding to the pool 20b. For example, the free chunk management table may include a start physical address corresponding to the first index in the pool 20b, an end physical address corresponding to the last index in the pool 20b, and a physical address to be assigned next. The physical address to be assigned next is the physical address that is to be assign to a chunk 20a next, and is updated in response to a chunk 20a is allocated to a virtual address (changed to the next physical address; e.g., the address is incremented).

The start logical (virtual) address (may also be referred to start address) indicates the virtual address having the smallest (or beginning) address among the virtual addresses in the pool 20b. When a pool 20b is generated temporarily by the pool management unit 22, the setting of the start logical address may be omitted; or when a temporary start address is set by the pool management unit 22, that temporary start address may be set to the start logical address.

The end logical (virtual) address (may also be referred to end address) indicates the virtual address having the largest (or last) address among the virtual addresses in the pool 20b.

When a pool 20b is generated temporarily by the pool management unit 22, the setting of the end logical address may be omitted; or when a temporary end address is set by the pool management unit 22, that temporary end address may be set to the end logical address.

When start and end addresses are temporarily set, they may be set to the start logical address and the end logical address, respectively. However, the allocation range of the virtual addresses is preferably set upon a first write. This is because if start and end addresses are set in advance, the possibility where virtual addresses do not corresponding to any of pools 20b, is increased, and a virtual address is allocated to the pool 20b having the oldest time stamp, as discussed later. In other words, by determining the allocation range of the virtual addresses upon a first write, the allocation range of the virtual addresses is prevented from being extended in the pool 20b, thereby minimizing the seek distances in the physical disk 10 upon read I/Os to sequential virtual addresses.

When the chunk allocating unit 23A allocates a free chunk 20a in a pool 20b to a new virtual address, the pool management unit 22 replaces the start logical address with the new virtual address if the new virtual address is smaller than the start logical address. If the new virtual address is greater than the end logical address, the pool management unit 22 replaces the end logical address with the new virtual address. If no chunk 20a has not been allocated yet (when a chunk 20a is allocated from that pool 20b for the first time), the pool management unit 22 replaces the start logical address and the end logical address with the new virtual address.

The time stamp is the date and time when information about the pool 20b is created or updated. Note that the pool management unit 22 can maintain information in the pool management table 21b in an array depicted in FIG. 6.

The chunk allocating unit 23A obtains a chunk 20a to be allocated to (associated with) a write address based on the write address (virtual address) specified in a received write I/O.

For example, the chunk allocating unit 23A determines whether or not a virtual address equal to the write address is found in the V-R map 21a. When a virtual address equal to the write address is found in the V-R map 21, that write I/O is for writing a second or subsequent differential data. Hence, the chunk allocating unit 23A acquires the physical address corresponding to the write address from the V-R map 21a (obtains the chunk 20a), and notifies the access process unit 24 of information of that physical address.

Otherwise, when no virtual address equal to the write address is found in the V-R map 21, that write I/O is for writing a first differential data. Thus, the chunk allocating unit 23A looks up the pool management table 21b, and selects the pool 20b using the write address (virtual address) as a key and obtains (chooses) a chunk 20a in the selected pool 20b.

For example, for selecting the chunk 20a, the chunk allocating unit 23A uses the write address, a value (address) obtained by subtracting a predetermined threshold from the start logical address, and a value (address) obtained by adding the predetermined threshold to the end logical address, in each pool 20b in the pool management table 21b.

Figure 7:
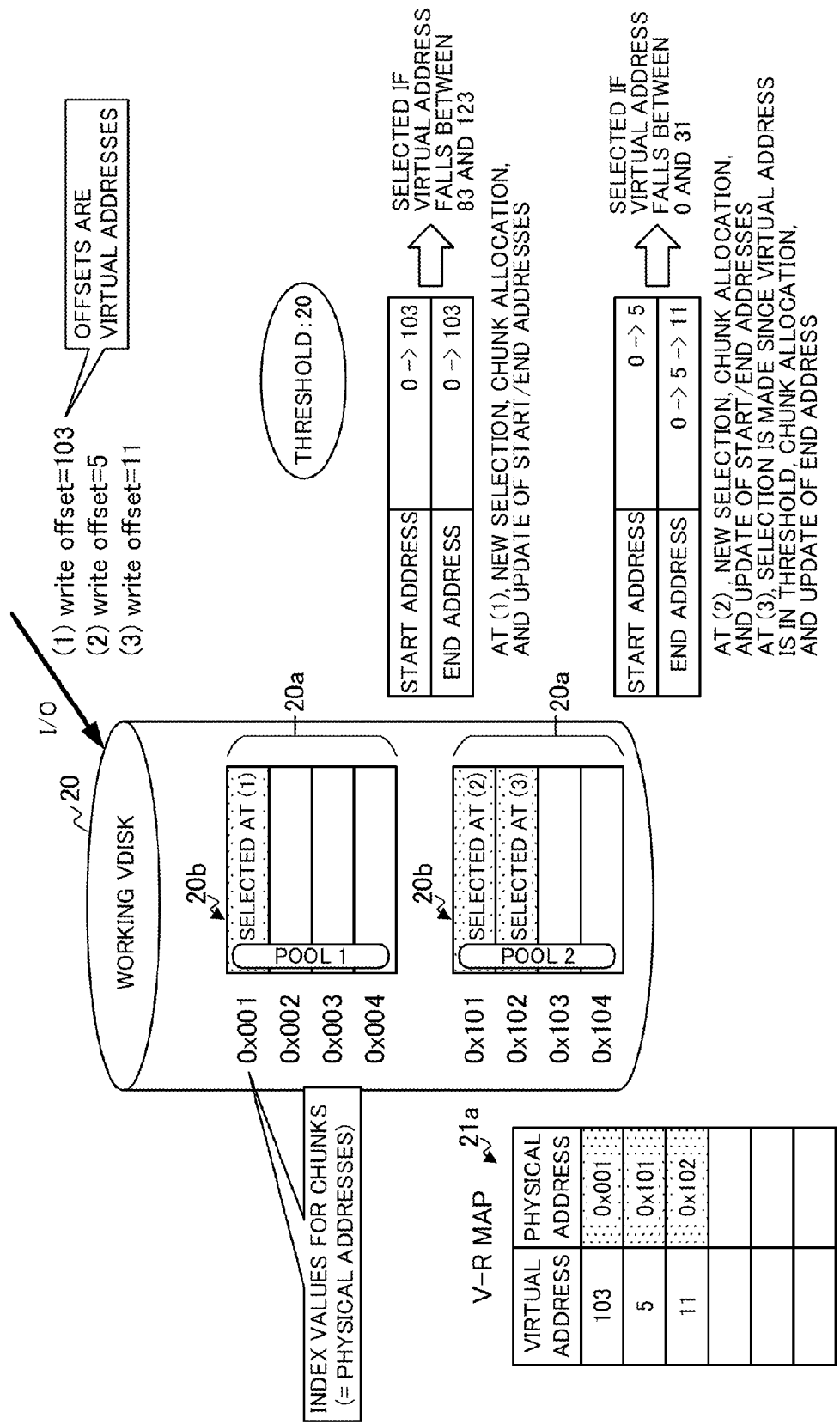
FIG. 7 is a diagram illustrating an example where first writes into a working VDISK are random writes according to the first embodiment.
Figure 8:
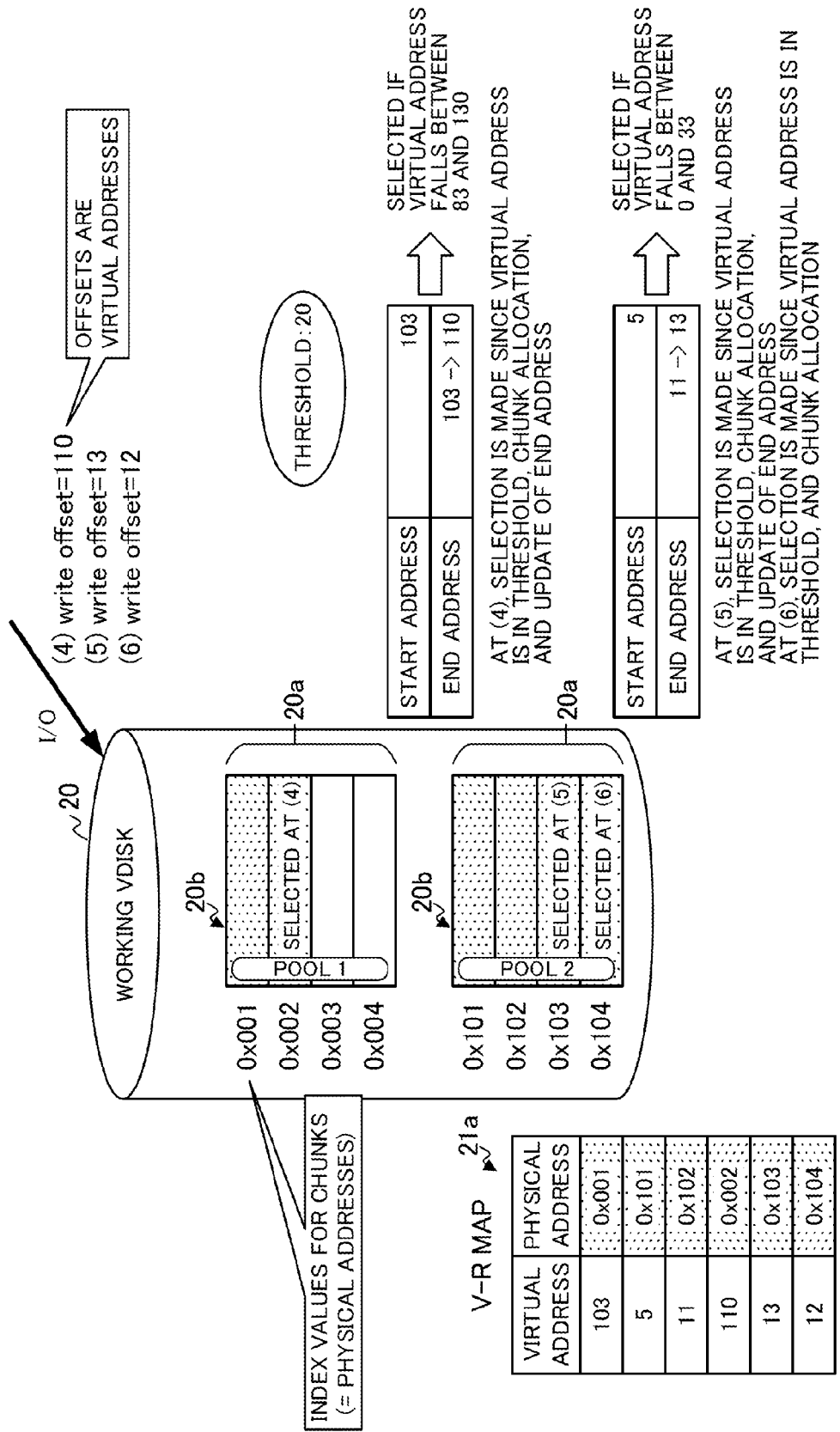
FIG. 8 is a diagram illustrating an example where first writes into a working VDISK are random writes according to the first embodiment.

For example, as depicted in FIGS. 7 and 8, a first writes are random writes (writes to virtual addresses of offsets of "103", "5", "11", "110", "13", and "12"). Here, it is assumed that no chunk 20a has been allocated to any virtual address in all of the pools 20b in the working VDISK 20, and that the predetermined threshold is "20".

(1) Write I/O of an Offset of "103"

The chunk allocating unit 23A checks the pool management table 21b and searches for a pool 20b where the write address "103" falls within the range from "the start logical address−a predetermined threshold (the minimum value is "0")" to "the end logical address+ the predetermined threshold". However, since no chunk 20a has been allocated to any virtual address in all of the pools 20b, both the start logical address and the end logical address have not been set (i.e., they are set to "0"). Thus, the allocation range of the virtual addresses of each pool 20b is calculated between "0" and "20".

Since there is no pool 20b that can store the write address "103", the chunk allocating unit 23A allocates the first chunk 20a in a free pool 20b to the write address "103" (see Pool 1, index "0x001" in the working VDISK 20 in FIG. 7). To do this, the chunk allocating unit 23A looks up the free chunk management table in the pool management table 21b, selects a free pool 20b having the smallest start physical address, and determines the first chunk 20a, as the physical address to be assigned next (=start physical address).

At this timing, the pool management unit 22 subtracts one from the free chunk count of Pool 1, sets "103" to the start logical address and the end logical address, and sets the updating date and time to the time stamp, in the pool management table 21b. Furthermore, the pool management unit 22 sets the index "0x002", which is the next index to the index that has been allocated by the chunk allocating unit 23A, to the physical address to be assigned next in the free chunk management table, in the pool management table 21b.

Further, in response to the write data being written into the chunk 20a by the access process unit 24, the chunk allocating unit 23A registers the virtual address "103" and the physical address "0x001" that have been allocated to (associated with) each other, into the V-R map 21a (see the V-R map 21a in FIG. 7).

(2) Write I/O of an Offset of "5"

In response to receiving a subsequent write I/O, the chunk allocating unit 23A looks up the pool management table 21b, and searches for a pool 20b that includes the write address "5" in the allocation range, in the manner similar to above case (1). Since the allocation range is between "103−20=83" and "103+20=123" in the above case (1), Pool 1 is not selected. Instead, the chunk allocating unit 23A selects Pool 2 having an allocation range between "0" and "20" (i.e., the default range).

As depicted in FIG. 7, the chunk allocating unit 23A then allocates the first chunk 20a (of an index of "0x101") in Pool 2 to the write address "5", based on the physical address to be assigned next of Pool 2. Note that the pool management unit 22 updates the pool management table 21b, and the chunk allocating unit 23A updates the V-R map 21a after a write of the write data, in the manner similar to above case (1).

(3) Write I/O of an Offset of "11"

In response to receiving a subsequent write I/O, the chunk allocating unit 23A looks up the pool management table 21b, and searches for a pool 20b that includes the write address "11" in the allocation range, in the manner similar to above cases (1) and (2). The chunk allocating unit 23A then selects Pool 2 having the write address "11" within the allocation range between "5−20=0" and "5+20=25".

As depicted in FIG. 7, the chunk allocating unit 23A allocates the next chunk 20a (of an index of "0x102") in Pool 2 to the write address "5", based on the physical address to be assigned next of Pool 2. Note that the pool management unit 22 updates the pool management table 21b, and the chunk allocating unit 23A updates the V-R map 21a after a write of the write data, in the manner similar to above cases (1) and (2). As a result, for subsequent write I/Os, the allocation range of Pool 2 is between "5−20=0" and "11+20=31".

(4) Write I/O of an Offset of "110"

In this case, the write address "110" is allocated to a chunk 20a of an index of "0x002" in Pool 1 having the allocation range between "103−20=83" and "103+20=123", and the end logical address of Pool 1 is changed from "103" to "110" (see FIG. 8).

(5) Write I/O of an Offset of "13"

In this case, the write address "13" is allocated to a chunk 20a of an index of "0x103" Pool 2 having the allocation range between "5−20=0" and "11+20=31", and the end logical address of Pool 2 is changed from "11" to "13" (see FIG. 8).

(6) Write I/O of an Offset of "12"

In this case, the write address "12" is allocated to a chunk 20a of an index of "0x104" Pool 2 having the allocation range between "5−20=0" and "13+20=33" (see FIG. 8). Since write address "12" is greater than the start logical address "5" and smaller than the end logical address "13", the start logical address and the end logical address are not updated.

As set forth above, for allocating a chunk 20a to a virtual address for the first time, the chunk allocating unit 23A allocates a free chunk 20a from a pool 20b within the range between "start logical address−threshold" and "end logical address+threshold", using the write virtual address as a key. If the allocation range is expected to be extended, the chunk allocating unit 23A updates at least one of the start logical address and the end logical address.

As a result, in accordance with the chunk allocating unit 23A, chunks 20a in the same pool 20b can be allocated to neighboring virtual addresses. Thus, as in the example in FIG. 9, upon processing sequential read I/Os that are requested after random write I/Os, the seek distances to the physical disks 10 can be reduced, which helps to improve the access performance.

Figure 9:
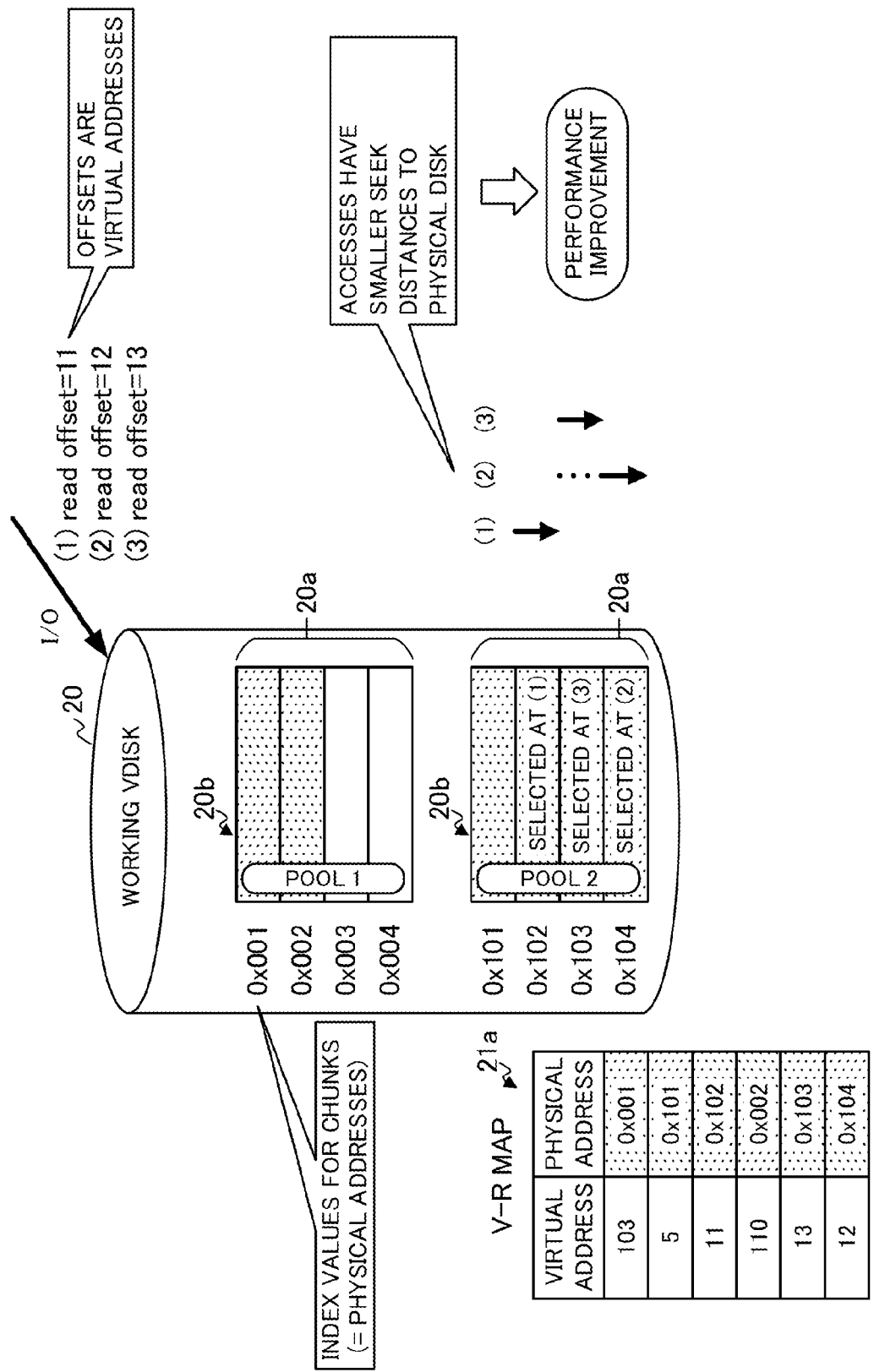
FIG. 9 is a diagram illustrating an example where sequential read I/Os are made in FIG. 8.

FIG. 9 illustrates an example where sequential read I/Os to offsets "11", "12", and "13" are made after processing of the write I/O (6) in FIG. 8. In this example, all virtual addresses for sequential read I/Os are allocated to physical address in Pool 2.

Accordingly, when the management server 2 reads data from a RAID apparatus 1 (physical disk 10), read data can be read from neighboring physical addresses (physical areas) of "0x102", "0x104", and "0x103" in the physical disk 10. Since the seek distances of the accesses of the physical disk 10 can be reduced, the read data can be read in short time and the response performance to a business server 4 requesting the read I/Os can be improved.

Further, every time the chunk allocating unit 23A allocates a chunk 20a from a pool 20b to a virtual address, the chunk allocating unit 23A attempts to update the allocation range of virtual addresses in that pool 20b. As a result, every time a write I/O is issued, the allocation range of the virtual addresses can be extended appropriately, taking the offset into account. This can reduce the possibility where a write address for a write I/O is out of the allocation range, and thus neighboring virtual addresses are aggregated in a single pool 20b.

Furthermore, when the chunk allocating unit 23A determines that no pool 20b can be allocated to a write address in the determination of the allocation range from the start logical address and the end logical address, the chunk allocating unit 23A select an unused pool 20b. When there is no unused pool 20b, the chunk allocating unit 23A can select the pool 20b having the oldest update date and time, based on the time stamp.

As a result, when no pool 20b can be allocated to the write address, a chunk 20a can be selected, for being allocated to the write address, from a pool 20b which is possibly the least affected by any extension of the allocation range. Accordingly, for that pool 20b, even when at least one of the start logical address and the end logical address are updated and the allocation range is extended, any deterioration of the performance of sequential read I/Os is minimized.

When the write address falls within allocation ranges of multiple (e.g., two) pools 20b, the chunk allocating unit 23A can select the pool 20b that is closer to the write address. For example, when the management server 2 maintains pools 20b as depicted in FIG. 10, Pool 2 is selected for the write address (virtual address) of an offset of "65". FIG. 10 illustrates an example where the chunk allocating unit 23A calculates, for each pool 20b, the difference between either of the start logical address and the end logical address, which is closer to the write address, and the write address of the write I/O, and selects the pool 20b with the smallest difference. As a result, neighboring virtual addresses are aggregated in a single pool 20b, and the performance of sequential read I/Os can be improved.

In addition, upon searching for a pool 20b where the write address falls within the allocation range, once the chunk allocating unit 23A finds a pool 20b where the write address falls between the start logical address and the end logical address, the chunk allocating unit 23A may selects a chunk 20a from that pool 20b. This is because the possibility where the write address falls within the allocation ranges of other pools 20b is low, and even if there is any, the allocation range would be extended with the predetermined threshold for that pool 20b, in other words, the identified pool 20b is the closest to the write address. In this case, the chunk allocating unit 23A may stop the search for other pools 20b. This can reduce the load for searching for the pool 20b and thus the time for the search is reduced.

As set forth above, the pool management unit 22 can represent one example of a defining (setting) unit that defines, in the physical area, a continuous area having a plurality of continuous physical addresses, and defines, based on a virtual address to which a physical address in the continuous area has initially been allocated, an allocation range of virtual addresses. The chunk allocating unit 23A can represent one example of an allocation (allocating) unit that allocates a physical address in the defined continuous area, to a virtual address in the defined allocation range.

Referring back to FIG. 4, the chunk allocating unit 23A notifies the access process unit 24 of information of the chunk 20a obtained as described above.

The access process unit 24 accesses the chunk 20a that is notified by the chunk allocating unit 23A, and writes the write data for the write I/O. When the write is a first write and the write data is smaller than the chunk size, the access process unit 24 can perform a copy-on write operation (processing).

In a copy-on write operation, the access process unit 24 reads data that supplements the write data to form a chunk 20a from the master VDISK 20, stores it in the memory 2b, and generates data with a size of the chunk 20a by merging the data with the write data. The access process unit 24 then writes the generated data into the chunk 20a that is notified by the chunk allocating unit 23A.

(2-3) Example Operation of Management Server

Next, an example operation of the management server 2 configured as described above, will be described with reference to FIGS. 11 and 12.

With reference to the flowchart depicted in FIG. 11, an example operation of write I/O processing in the management server 2 will be described.

Figure 11:
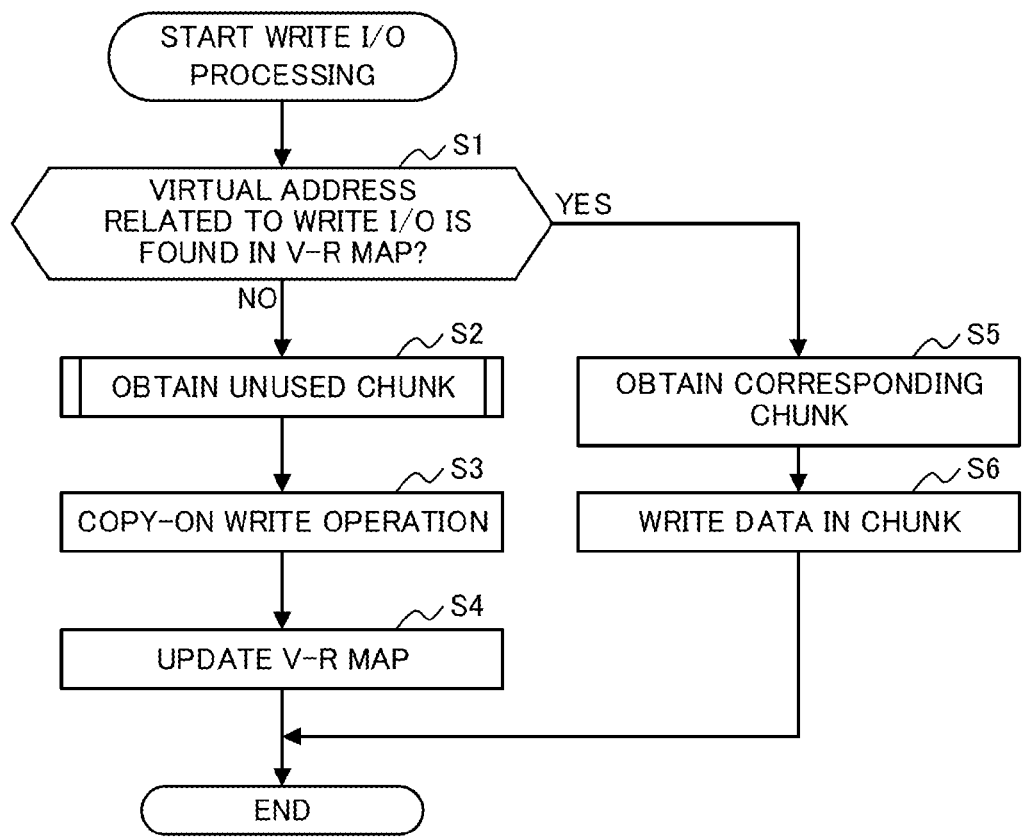
FIG. 11 is a flowchart illustrating an example of write I/O processing in the management server according to the first embodiment.

As depicted in FIG. 11, when a write I/O is received, the chunk allocating unit 23A in the management server 2 determines whether or not the virtual address for the write I/O is found in the V-R map 21a (Step S1). If the virtual address for the write I/O is not found in the V-R map 21a (NO route from Step S1), the chunk allocating unit 23A obtains an unused chunk 20a in one pool 20b among multiple pools 20b (Step S2).

Next, the chunk allocating unit 23A notifies the access process unit 24 of the obtained chunk 20a. The access process unit 24 writes the write data into the notified chunk 20a. When the size of write data is smaller than the size of the chunk 20a, a copy-on write operation is executed to merge the write data with supplemental data read from the master VDISK 20 and write it into the chunk 20a (Step S3).

The chunk allocating unit 23A then registers (updates) the virtual address to which the write data has been written and the physical address that are allocated to (associated with) each other, in the V-R map 21a (Step S4), and the processing ends.

Otherwise, if the virtual address for the write I/O is found in the V-R map 21a (YES route from Step S1), the chunk allocating unit 23A acquires (obtains) the physical address (chunk 20a) corresponding to the virtual address, from the V-R map 21a (Step S5).

The chunk allocating unit 23A then notifies the access process unit 24 of the obtained chunk 20a. The access process unit 24 writes the write data into the notified chunk 20a (Step S6), and the processing ends. This is the end of processing of the write I/O in the management server 2.

Next, with reference to the flowchart depicted in FIG. 12, an example operation of processing for obtaining an unused chunk 20a by the chunk allocating unit 23A (and the pool management unit 22) will be described (detailed example of Step S2 in FIG. 11).

Figure 12:
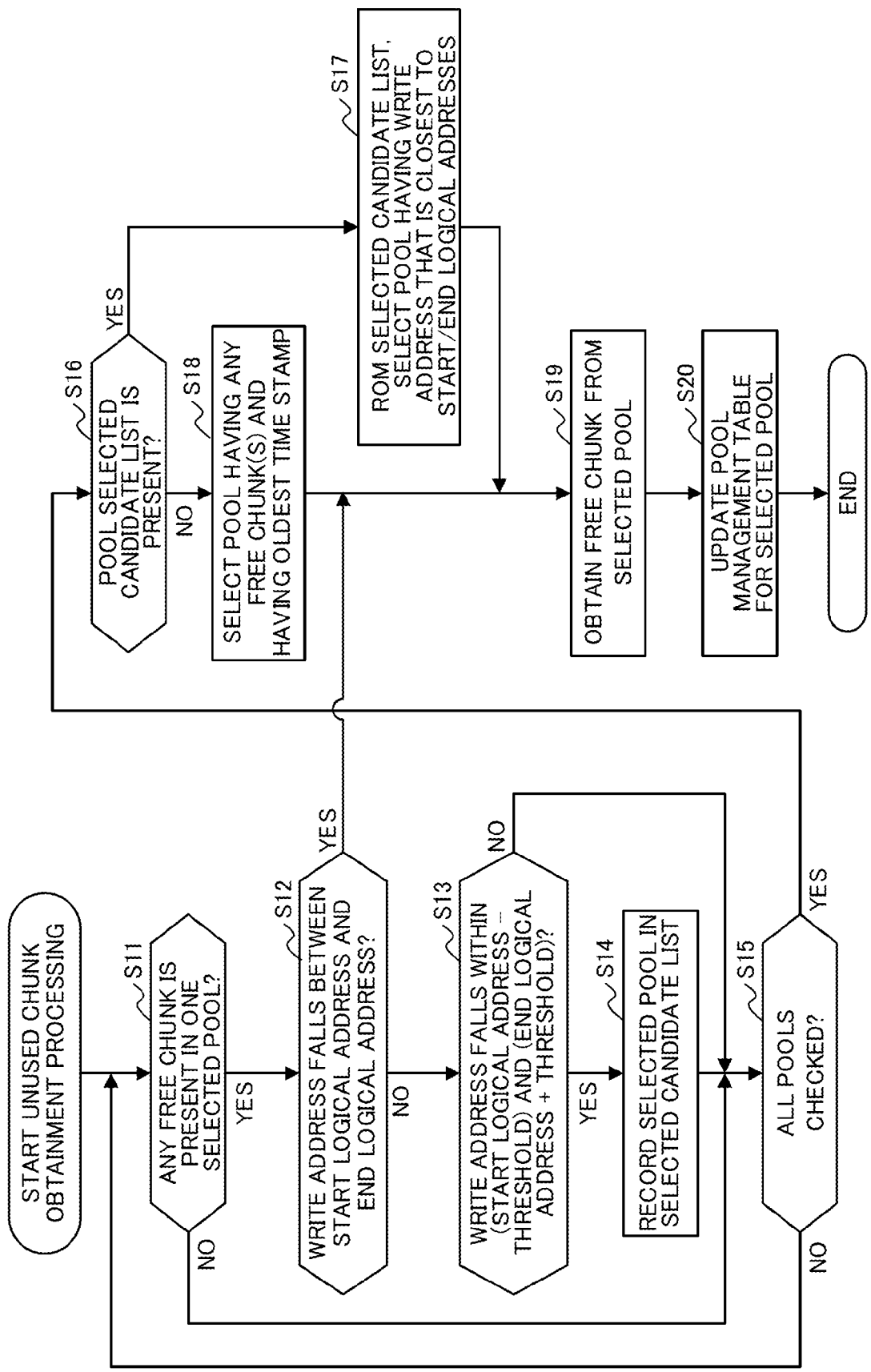
FIG. 12 is a flowchart illustrating one example of processing for obtaining unused chunks by a chunk allocating unit according to the first embodiment.

As depicted in FIG. 12, the chunk allocating unit 23A selects one pool 20b from the multiple pools 20b, and determines whether or not there is any free chunk 20a in the selected pool 20b (Step S11). If there is any free chunk 20a in the selected pool 20b (YES route from Step S11), the chunk allocating unit 23A looks up the pool management table 21b, and acquires the start and end logical addresses for the selected pool 20b. The chunk allocating unit 23A then determines whether or not the write address of the write I/O (virtual address) falls between the start logical address and the end logical address (Step S12).

If the write address falls between the start logical address and the end logical address (YES route from Step S12), the flow moves to Step S19. Otherwise, if the write address does not fall between the start logical address and the end logical address (NO route from Step S12), the chunk allocating unit 23A determines whether or not the write address falls between "start logical address−threshold" and "end logical address+threshold" (Step S13).

If the write address falls between the start logical address and the end logical address adjusted with the predetermined threshold (YES route from Step S13), the chunk allocating unit 23A saves the selected pool 20b in a selected candidate list (Step S14) and the flow moves to Step S15. Otherwise, if the write address does not fall between the start logical address and the end logical address adjusted with the predetermined threshold (NO route from Step S13), the flow moves to Step S15. Further, if there is no free chunk 20a in the selected pool 20b in Step S11 (NO route from Step S11), the flow moves to Step S15.

In Step S15, the chunk allocating unit 23A determines whether or not all of the pools 20b have been checked (at least a part of determinations in Steps S11 to S13 has been performed). If not all of the pool 20b have been checked yet (NO route from Step S15), the flow moves to Step S11.

If it is determined that all of the pools 20b have been checked in Step S15 (YES route from Step S15), the chunk allocating unit 23A determines whether or not there is a selected candidate list for the pools 20b (Step S16). If there is a selected candidate list (YES route from Step S16), the chunk allocating unit 23A selects, from the selected candidate list, the pool 20b having a start or end logical address that is closest to the write address (Step S17), and the flow moves to Step S19.

Otherwise, if there is no selected candidate list (NO route from Step S16), the chunk allocating unit 23A selects, from the multiple pools 20b, the pool 20b that has any free chunks 20a and that has the oldest time stamp (date and time) (Step S18). The chunk allocating unit 23A then obtains a free chunk 20a from the selected pool 20b (Step S19). At this step, the chunk allocating unit 23A notifies the access process unit 24 of the obtained chunk 20a.

When Step S19 is reached via Step S17, the chunk allocating unit 23A obtains a free chunk 20a from the selected pool 20b in the selected candidate list. When Step S19 is reached via the YES route from Step S12, the chunk allocating unit 23A obtains a free chunk 20a from the pool 20b where the write address falls between the start logical address and the end logical address (the pool 20b selected in Step S11).

The pool management unit 22 then updates the pool management table 21b with the pool 20b containing the chunk 20a obtained by the chunk allocating unit 23A (Step S20), and the processing ends. In Step S20, the pool management unit 22 performs a subtraction from the free chunk count and updates the time stamp. When the write address is smaller than the start logical address, the start logical address is updated. When the write address is greater than the end logical address, the end logical address is updated. This is the end of the processing for obtaining an unused chunk 20a by the chunk allocating unit 23A (and the pool management unit 22).

(2-4) Advantageous Effects of First Embodiment

In accordance with the virtual storage apparatus of the first embodiment, the allocation range of the virtual addresses to be allocated to the pool 20b is defined, based on a virtual address that is allocated to a chunk 20a (physical address) in a pool 20b (in other words, continuous area).

Then, a chunk 20a in the pool 20b is allocated to a virtual address within the defined allocation range. As a result, seek time in the physical disk 10 is reduced, and the access performance of sequential read I/Os to virtual addresses where differential data is present, can be improved, in other words, the access performance is prevented from deteriorating.

Furthermore, since virtual addresses not included in the pool 20b (out of the allocation range) are allocated to chunks 20a in a different appropriate pool 20b, continuous areas that are physically continuous, are allocated for each allocation range of virtual addresses. As a result, the access performance of sequential read I/Os can be improved in all of the virtual disks 20.

Conventionally, since chunks are allocated to virtual addresses in the order of write I/Os, pieces of differential data for sequential virtual addresses are physically located randomly in a physical disk. In such a case, sequential read I/Os are random read I/Os to the physical disk in a virtual storage apparatus, and the access performance deteriorates.

In contrast, in the management server 2 according to the first embodiment, when a write I/O to a virtual address is requested, a chunk 20a for storing differential data is selected using the virtual address as a key. The management server 2 controls such that multiple pieces of differential data for sequential virtual addressees are written in neighboring blocks (chunks 20a) in a physical disk 10, which helps to improve the access performance.

Furthermore, for example, the OS 40 or 42 in the business servers 4 may divide a single snapshot disk (virtual disk 20), or partitions a single snapshot disk, so that divided areas can be used by multiple applications. In such a case, in a virtual storage apparatus of conventional techniques, first writes are random accesses, and deterioration of the performance is observed in subsequent sequential read I/Os. In contrast, the management server 2 according to the first embodiment can improve the access performance.

Furthermore, in accordance with the management server 2, when allocating physical addresses to virtual addresses, generally sequential allocation are possible in real time, and the access performance is improved immediately after the allocation, as compared to other techniques where data are rearranged at later time, such as defrag.

(2-5) First Modification to First Embodiment

Figure 13:
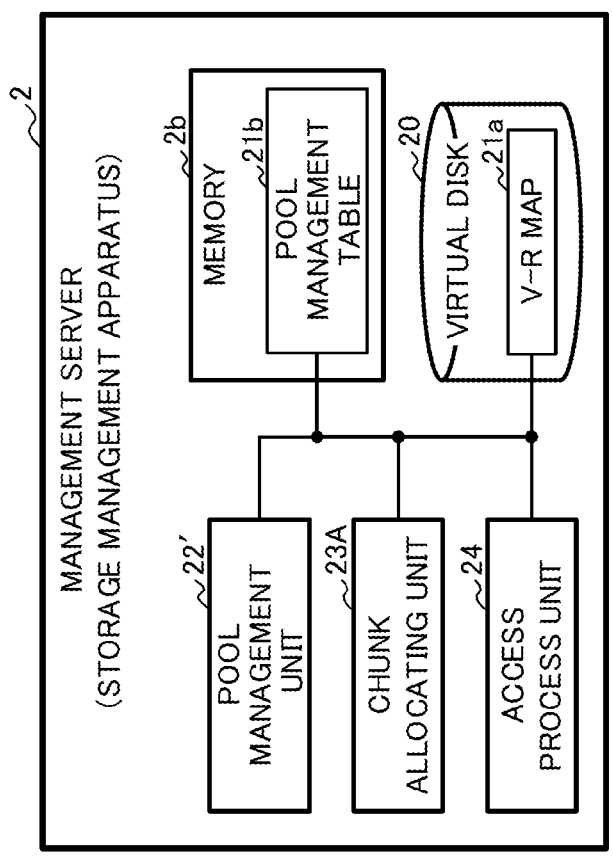
FIG. 13 is a diagram illustrating an example functional configuration of the management server according to the first modification to the first embodiment.

Although the range of virtual addresses of each pool 20b are defined upon a first write in the first embodiment, this is not limiting. For example, as depicted in FIG. 13, the management server 2 may include a pool management unit 22' that sets a fixed range of virtual addresses in advance, in place of the pool management unit 22.

As in the example in FIG. 14, upon creation of a pool 20b, the pool management unit 22' may set temporary start and end addresses, and sets the start and end addresses to the start logical address and the end logical address in the pool management table 21b, as described above.

Figure 15:
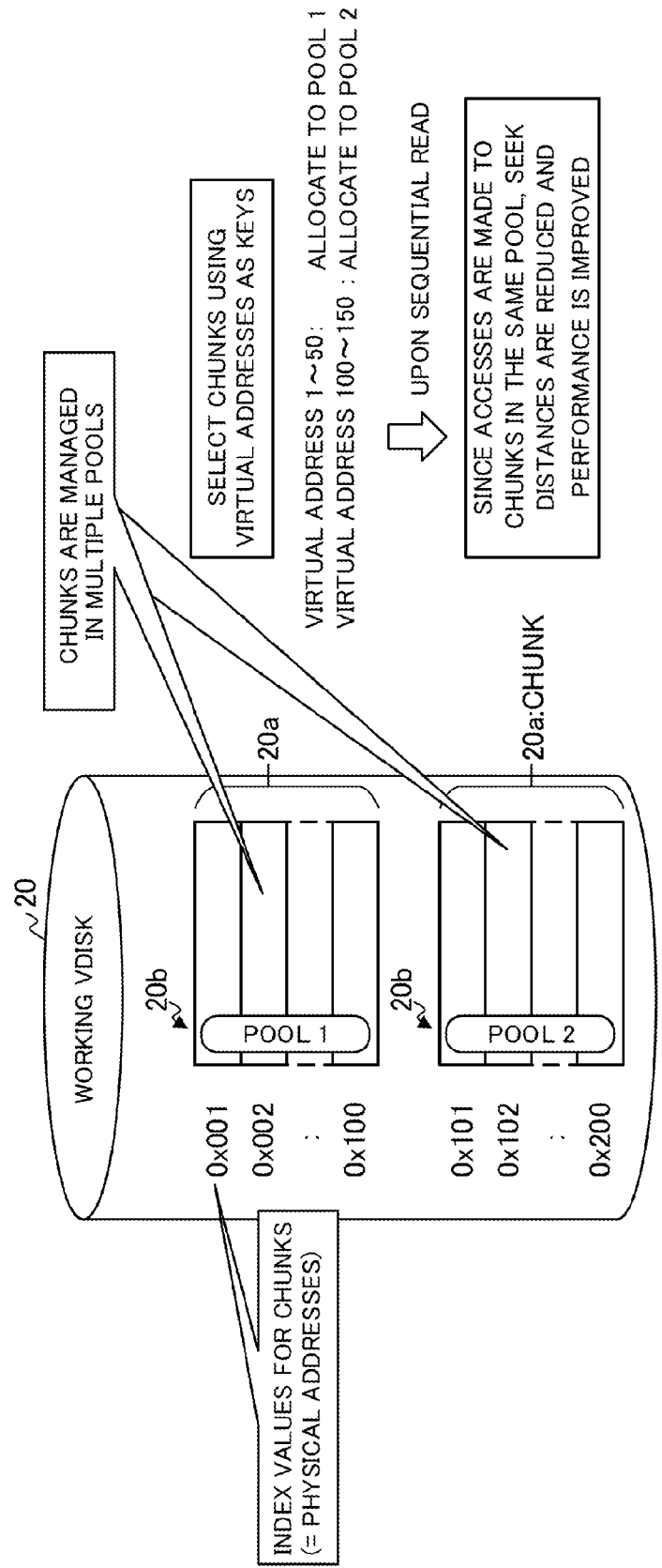
FIG. 15 is a diagram illustrating how areas of a snapshot are administered, according to the first modification to the first embodiment.

As depicted in FIG. 15, the pool management unit 22' sets a temporary range of offsets (virtual addresses) between "1" and "50", for a pool 20b with chunks 20a of indices (physical addresses) from "0x001" to "0x100". The pool management unit 22' sets a temporary range of offsets (virtual addresses) from "100" to "150", for another pool 20b with chunks 20a of indices (physical addresses) from "0x101" to "0x200". Although the number of chunks included in the pools 20b exceed the number of virtual addresses in the example in FIG. 15, the number of chunks may equal the number of virtual addresses.

Hence, the technique according to the first modification can provide the same effects as those of the first embodiment. Since the pool management unit 22' sets a temporary allocation range for pools 20b, update of the start logical address and the end logical address in the pool management table 21b is made unnecessary upon a first write. As a result, when the virtual address falls within the selection range of a pool 20b, the performance of allocation to the pool 20b can be improved.

(2-6) Second Modification to First Embodiment

Figure 16:
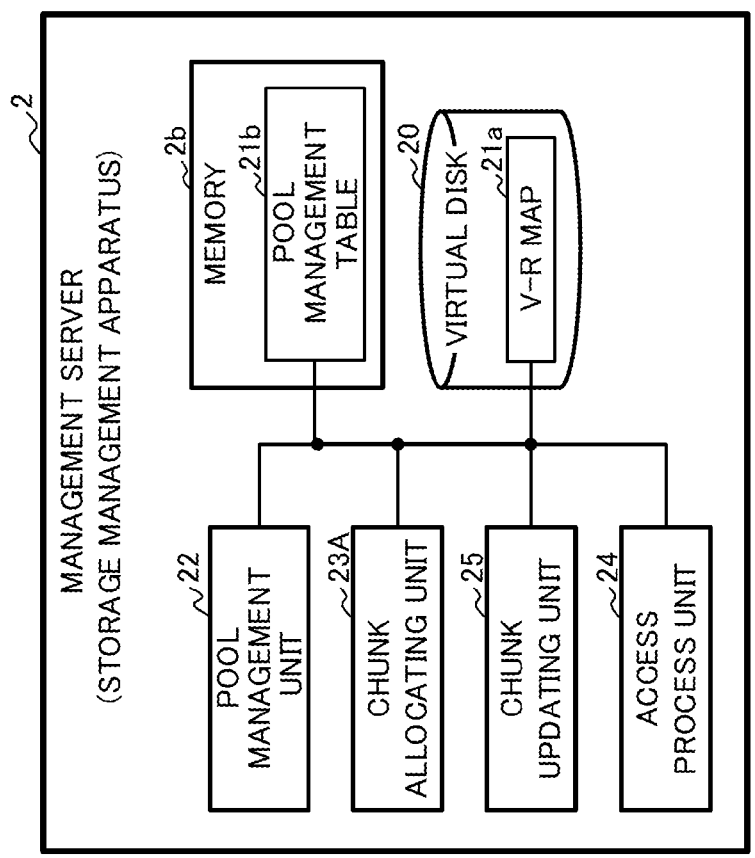
FIG. 16 is a diagram illustrating an example functional configuration of an management server according to a second modification to the first embodiment.
Figure 17:
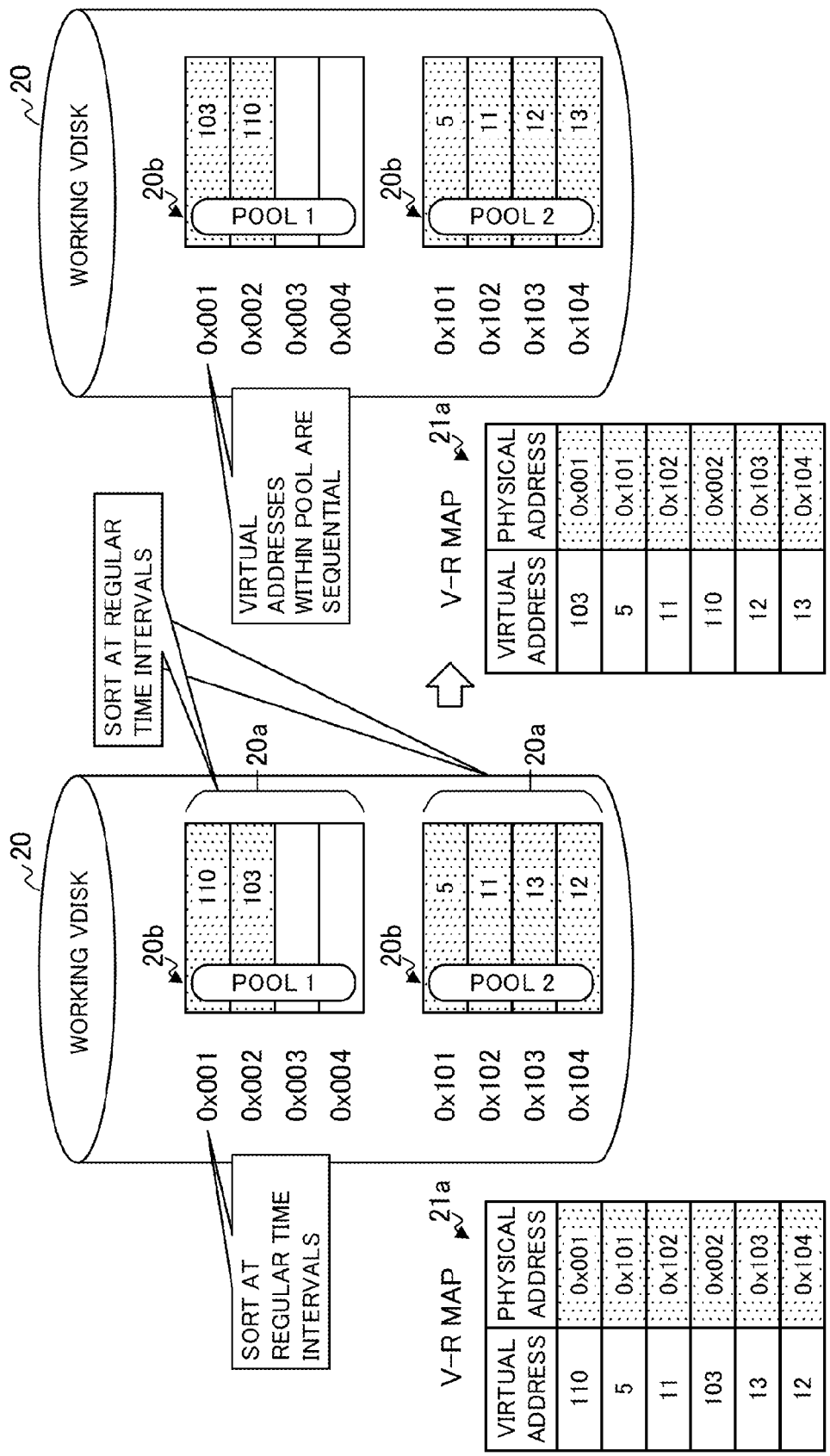
FIG. 17 is a diagram illustrating processing for sorting virtual addresses in a pool according to the second modification to the first embodiment.

Although the chunk allocating unit 23A sequentially allocates virtual addresses within the allocation range of the pool 20b upon first accesses in the first embodiment and the first modification, this is not limiting. For example, as depicted in FIGS. 16 and 17, the management server 2 may include a chunk updating unit 25 that sorts virtual addresses in the pool 20b at certain timing (e.g., periodically).

Figure 18:
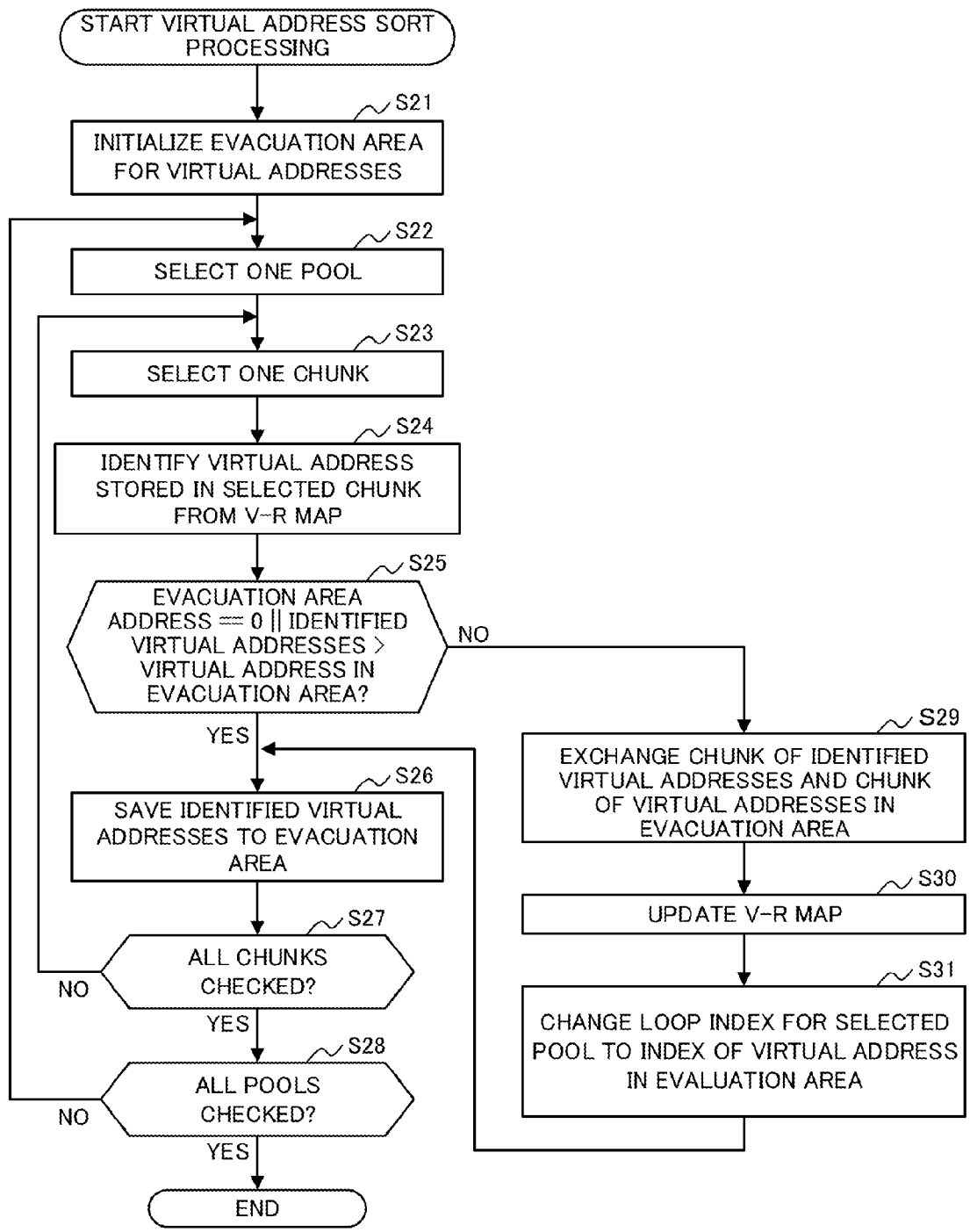
FIG. 18 is a flowchart illustrating processing for sorting virtual addresses in a pool by a chunk updating unit according to the second modification to the first embodiment.

Hereinafter, an example operation of processing for sorting virtual addresses by the chunk updating unit 25 will be described with reference to the flowchart in FIG. 18.

Initially, the chunk updating unit 25 initializes a virtual address retreat (evacuation) area in a storage area, e.g., the memory 2b or the virtual disks 20 (Step S21). Note that the chunk updating unit 25 may obtain a fresh virtual address retreat area from a storage area, e.g., the memory 2b or the virtual disks 20.

Next, the chunk updating unit 25 selects one pool 20b (Step S22), and selects one chunk 20a from the selected pool 20b (Step S23). The chunk updating unit 25 then extracts, from the V-R map 21a, a virtual address stored in the selected chunk 20a (physical address) (Step S24).

Next, the chunk updating unit 25 determines whether or not the virtual address in the retreat area (the virtual address stored in the retreat area) is "0", and whether or not the extracted virtual address is greater than the virtual address in the retreat area (Step S25). The determination in Step S25 is made for all virtual addresses in the retreat area, in sequence.

If the virtual address in the retreat area is "0" or the extracted virtual address is greater than the virtual address in the retreat area (YES route from Step S25), the chunk updating unit 25 stores the extracted virtual address into the retreat area (Step S26).

The chunk updating unit 25 then determines whether or not the determination is made for all chunks 20a in the selected pool 20b (Step S27). If not all of the chunks 20a have been checked yet (NO route from Step S27), the flow moves to Step S23. Otherwise, all of the chunks 20a have been checked (YES route from Step S27), the chunk updating unit 25 determines whether or not the determination is made for all of the pools 20b (Step S28). If not all of the pools 20b have been checked yet (NO route from Step S28), the flow moves to Step S22. Otherwise, if all of the pools 20b have been checked (YES route from Step S28), the processing ends.

Otherwise, in Step S25, if the virtual address in the retreat area is not "0" (some value has been set) and the extracted virtual address is equal to or smaller than the virtual address in the retreat area, (NO route from Step S25), the flow moves to Step S29. In Step S29, the chunk updating unit 25 exchanges the chunk 20a in the physical address corresponding to the extracted virtual address, with the chunk 20a in the physical address corresponding to the virtual address in the retreat area.

The chunk updating unit 25 then updates the V-R map 21a (Step S30), and changes the loop index value for the selected pool 20b, to the index value for the virtual address in the retreat area (Step S31), and the flow moves to Step S26. As a result, the above determination is made for all of the extracted virtual addresses. This is the end of the processing for sorting virtual addresses in pools by the chunk updating unit 25.

The second modification to the first embodiment has advantageous effects similar to those of the first embodiment and the first modification thereto. Additionally, since the chunk updating unit 25 periodically sorts virtual addresses in the pool 20b, the virtual addresses are allocated in a more sequential manner. As a result, the access performance of sequential read I/Os can be further improved.

(3) Second Embodiment

Figure 19:
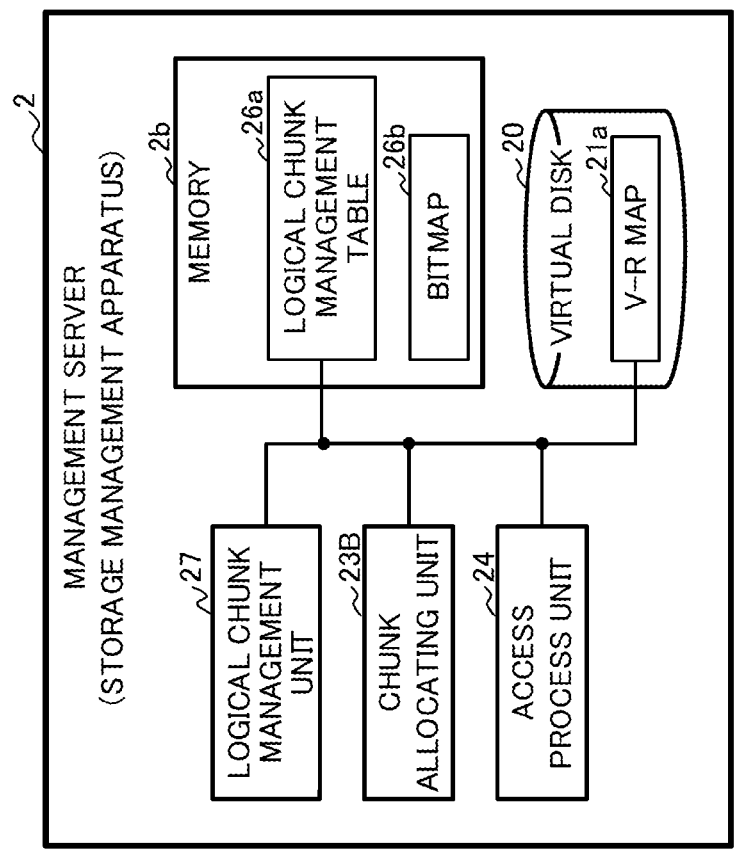
FIG. 19 is a diagram illustrating an example functional configuration of an management server as an example of a second embodiment.

Next, a management server 2 according to a second embodiment will be described. FIG. 19 is a diagram illustrating an example functional configuration of the management server 2 as an example of the second embodiment. As exemplified in FIG. 19, the management server 2 according to the second embodiment may include a logical chunk management unit 27, in place of the pool management unit 22 according to the first embodiment, and may further include a chunk allocating unit 23B that is different from the chunk allocating unit 23A. Further, a memory 2b in the management server 2 according to the second embodiment can store a logical chunk management table 26a and a bitmap 26b, in place of the pool management table 21b. In the following description of the second embodiment, descriptions of the functions and processing that are the same as those of the management server 2 according to the first embodiment are omitted.

Figure 20:
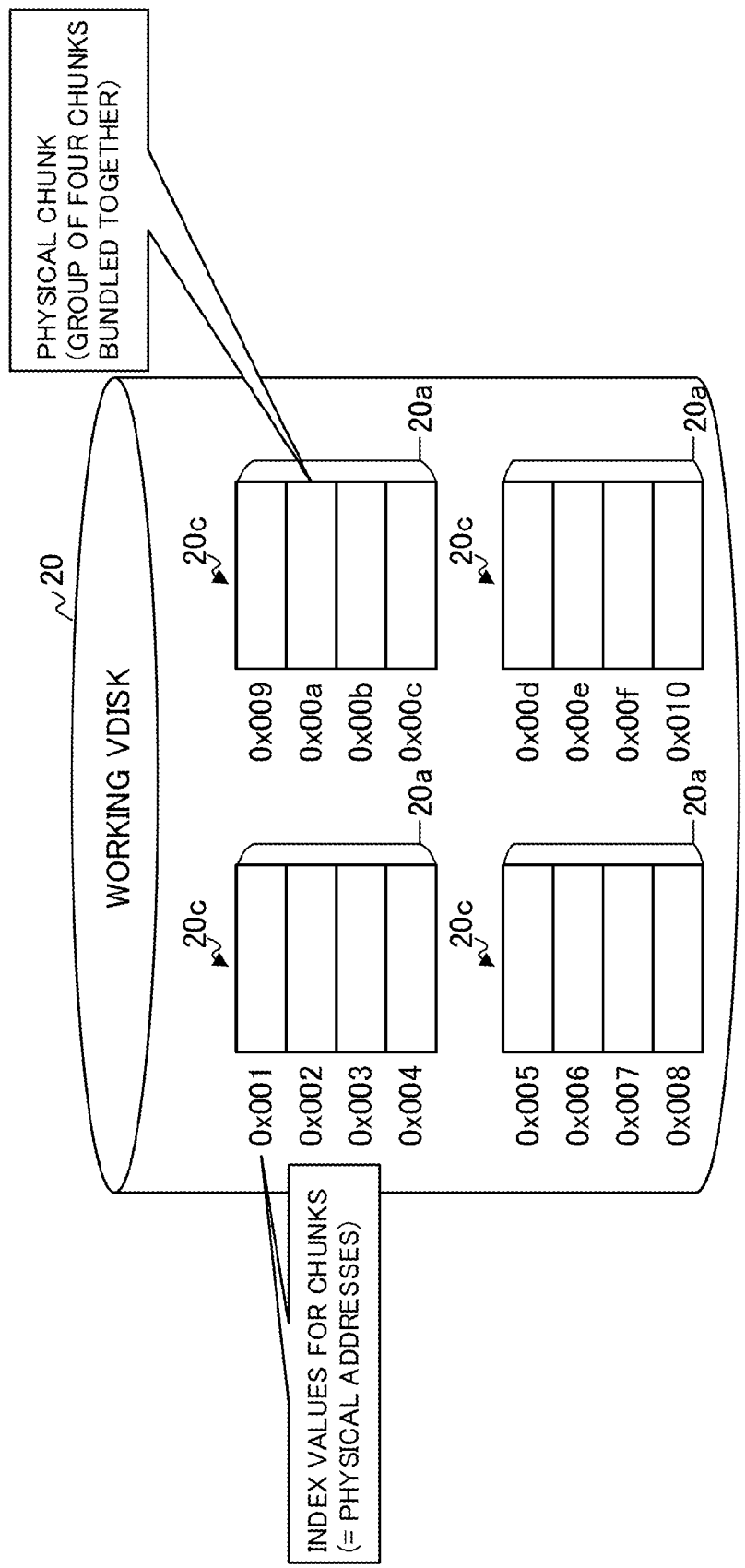
FIG. 20 is a diagram illustrating an example of how areas of a snapshot are administered, according to the second embodiment.

The logical chunk management unit 27 manages logical chunks 20c, each of which is a collection (group) of multiple chunks. An example of how areas of a snapshot are managed according to the second embodiment is illustrated in FIG. 20. As depicted in FIG. 20, a logical chunk 20c is a storage area (continuous area) formed by bundling (grouping) four continuous free areas (chunks 20a), for example, in physical disk 10. Note that the logical chunks 20c can include any number of chunks 20a.

The logical chunk management unit 27 may create, in advance, multiple logical chunks 20c, each of which includes a certain number of chunks 20a. In such a case, the logical chunk management unit 27 temporarily sets a range (start address and end address) of virtual addresses to be associated with (allocated to) chunks 20a in each logical chunk 20c. In other words, the range of virtual addresses (e.g., "0x001" to "0x004", "0x005" to "0x008", . . . ) contained in a single logical chunk 20c is defined by the number of chunks in the logical chunk 20c, and a logical chunk 20c is used (set as "Used"), when one chunk 20a in that logical chunk 20c is used.

Figure 21:
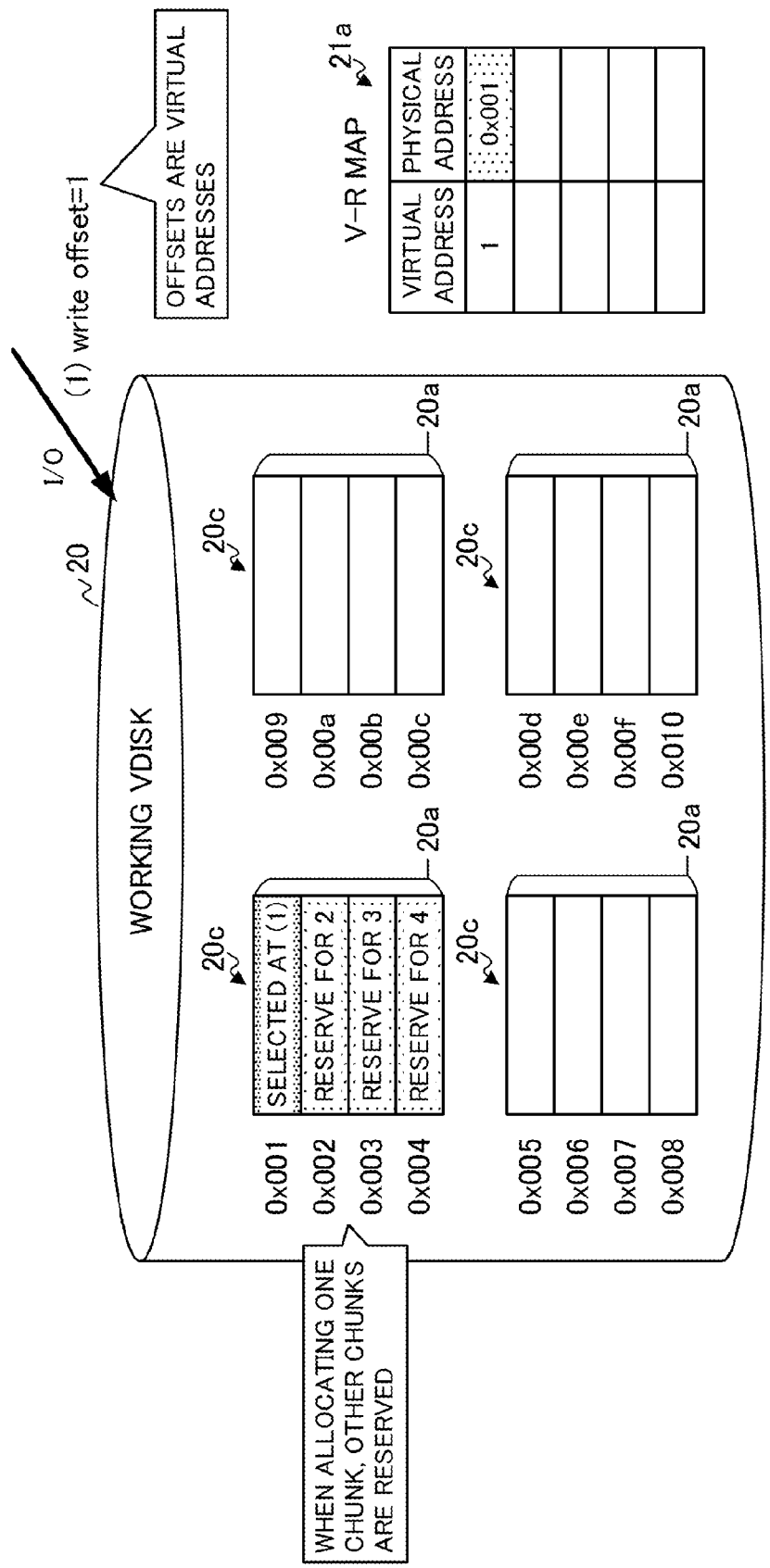
FIG. 21 is a diagram illustrating an example where first writes into a working VDISK are random writes according to the second embodiment.

In FIG. 21, for example, once one chunk 20a is used by the chunk allocating unit 23B, the logical chunk management unit 27 sets the rest of chunks 20a in the logical chunk 20c, to the "Reserved" state. As exemplified in FIG. 22, the reserved chunks 20a are allocated by the chunk allocating unit 23B only for allocating a virtual addresses continuous to a chunk 20a that has been already allocated.

Figure 22:
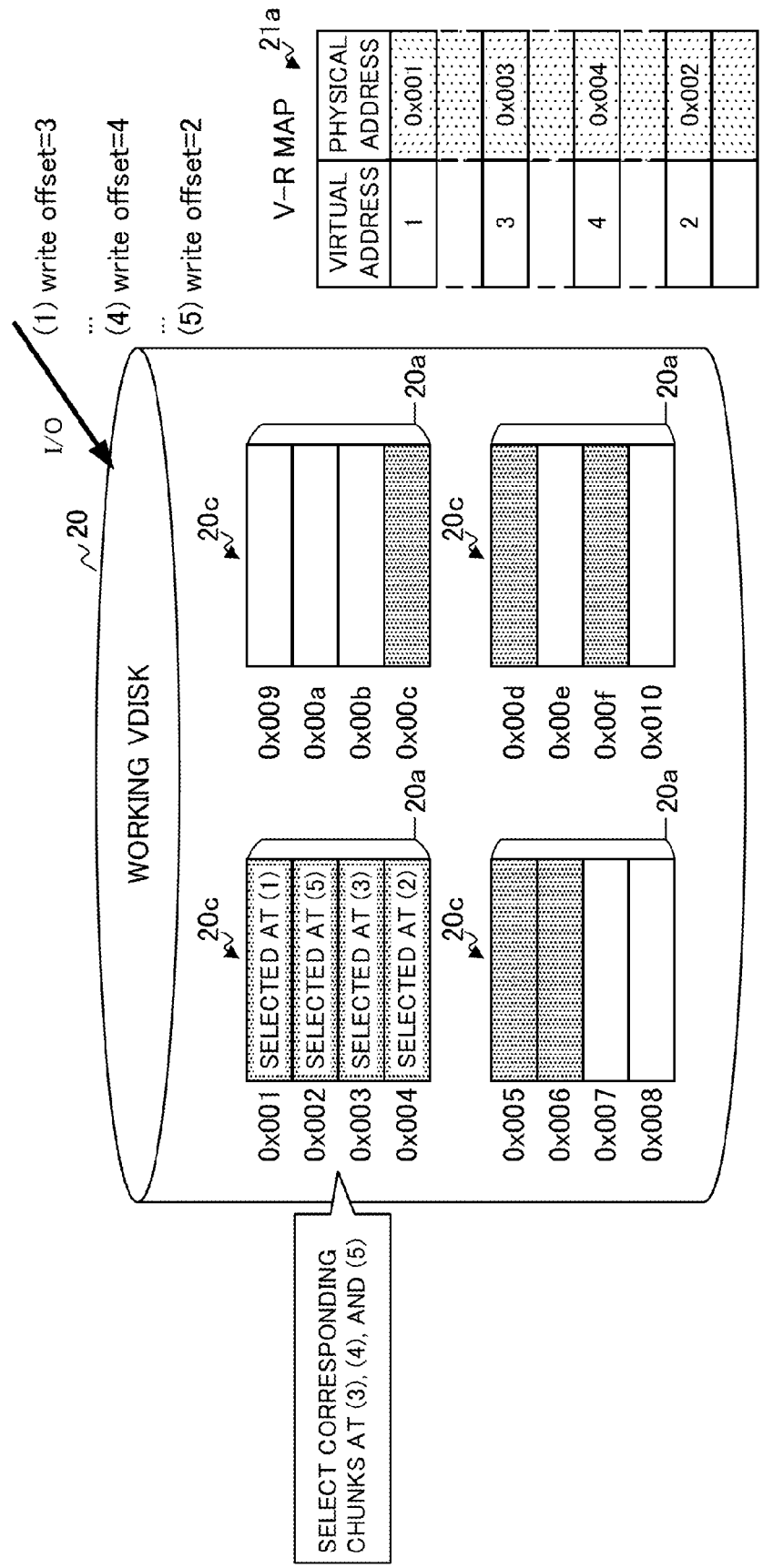
FIG. 22 is a diagram illustrating an example where first writes into a working VDISK are random writes according to the second embodiment.

For example, in FIG. 21, an index value (index, physical address) of "0x001" of a logical chunk 20c is allocated to a virtual address, in response to a first write I/O with an offset of "1". In this case, the remaining chunks 20a (indices of "0x002" to "0x004") in the logical chunk 20c including the index "0x001" are reserved, for future first write I/Os to offsets of "2" to "4". More specifically, as depicted in FIG. 22, in response to first write I/Os issued sequentially or randomly to offsets "3", "4", and "2", chunks 20a with indices of "0x003", "0x004", and "0x002" are allocated.

For managing the statuses of the logical chunks 20c, the logical chunk management unit 27 can use, by creating and updating, a logical chunk management table 26a in the memory 2b, for managing statuses of the logical chunk 20c and multiple chunks 20a. One example of the logical chunk management table 26a is depicted in FIG. 23.

Figure 23:
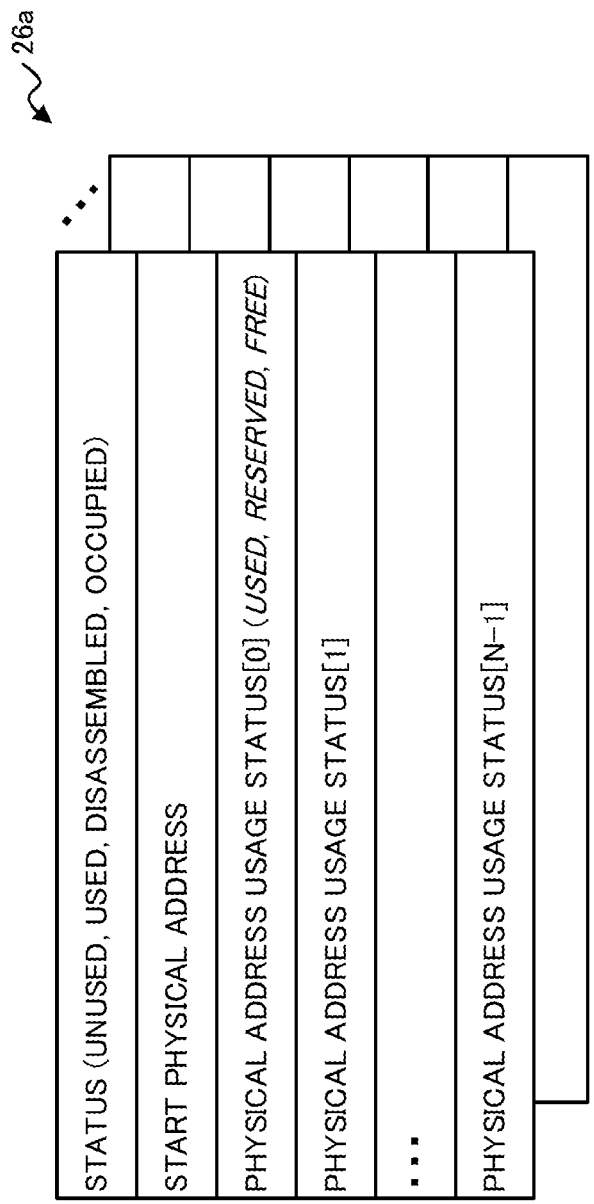
FIG. 23 is a diagram illustrating an example of a logical chunk management table depicted in FIG. 19.

As exemplified in FIG. 23, the logical chunk management table 26a may include, for each logical chunk 20c, the status of the logical chunk 20c, the start physical address, and the respective usage statuses of multiple physical addresses. The status of the logical chunk 20c is set to one of the following: "Unused" indicating that all chunks 20a are unused; "Used" indicating that at least one chunk 20a is used; "Disassembled" indicating that the logical chunk 20c is disassembled; and "No free chunk" indicating that there is no free chunk in all of the logical chunks 20c. The status of the logical chunk 20c is updated, for example, when any chunk 20a in the logical chunk 20c is used (allocated to a virtual address).

The start physical address indicates (is set to) the start physical address of the logical chunk 20c. The physical address usage status is set, for each chunk 20a (physical address) in the logical chunk 20c, to either one of "Used" indicating that the chunk 20a has been allocated to a virtual address, "Reserved" indicating that another chunk 20a is used, and "Free". The status of a chunk 20a is updated, for example, when that chunk 20a is used (allocated to a virtual address). Note that the logical chunk management unit 27 can manage information in the logical chunk management table 26a depicted in FIG. 23, in arrays.

Figure 24:
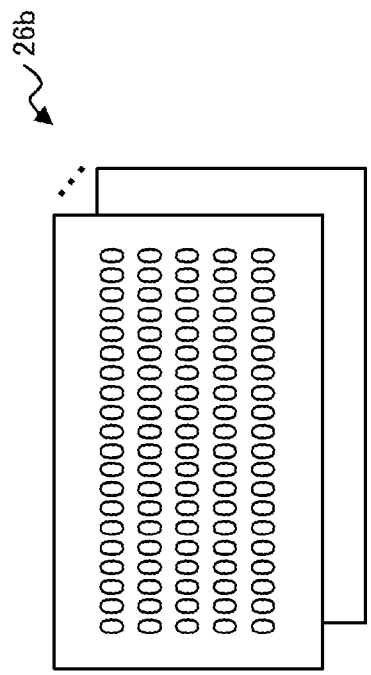
FIG. 24 is a diagram illustrating an example of a bitmap depicted in FIG. 19.

The logical chunk management unit 27 can also manage a bitmap exemplified in FIG. 24. As depicted in FIG. 24, the bitmap 26b indicates the usage status of a group of physical chunks (chunks 20a) used in a single logical chunk 20c, on the chunk 20a basis. In the bitmap 26b, the values "0" indicates that the corresponding chunks 20a are in the unused ("Reserved" or "Free") states, and the values "1" indicates that the corresponding chunks 20a are in the used state. In the example in FIG. 24, all of 100 chunks 20a in the one logical chunk 20c are in the unused state. The logical chunk management unit 27 can use the bitmap 26b to determine whether to disassemble a used logical chunk 20c, as will be described later.

The chunk allocating unit 23B obtains, based on a write address (virtual address) specified in a received write I/O, a chunk 20a to be allocated to the write address. For example, using the logical chunk management table 26a and the bitmap 26b, the chunk allocating unit 23B identifies a logical chunk 20c to be allocated to the write address in the write I/O (first write I/O), and the physical chunk (chunk 20a) for that logical chunk 20c.

If there is no chunk 20a for which a virtual address is reserved and there is no unused logical chunk 20c, upon allocating a chunk 20a, the chunk allocating unit 23B can disassemble a logical chunk 20c having a smaller chunk usage ratio, among the logical chunks 20c. The chunk allocating unit 23B then allocates a free chunk 20a from the disassembled logical chunk 20c to the virtual address. Thus, a storage area can be prevented from remaining unused.

The processing by the chunk allocating unit 23B (and the logical chunk management unit 27) will be described with reference to the flowchart depicted in FIG. 25 (the detailed example in Step S2 in FIG. 11). The following processing is performed when a write I/O is a first write I/O, in other words, when no virtual address that is the same as the offset (write address) is present in the V-R map 21a.

Figure 25:
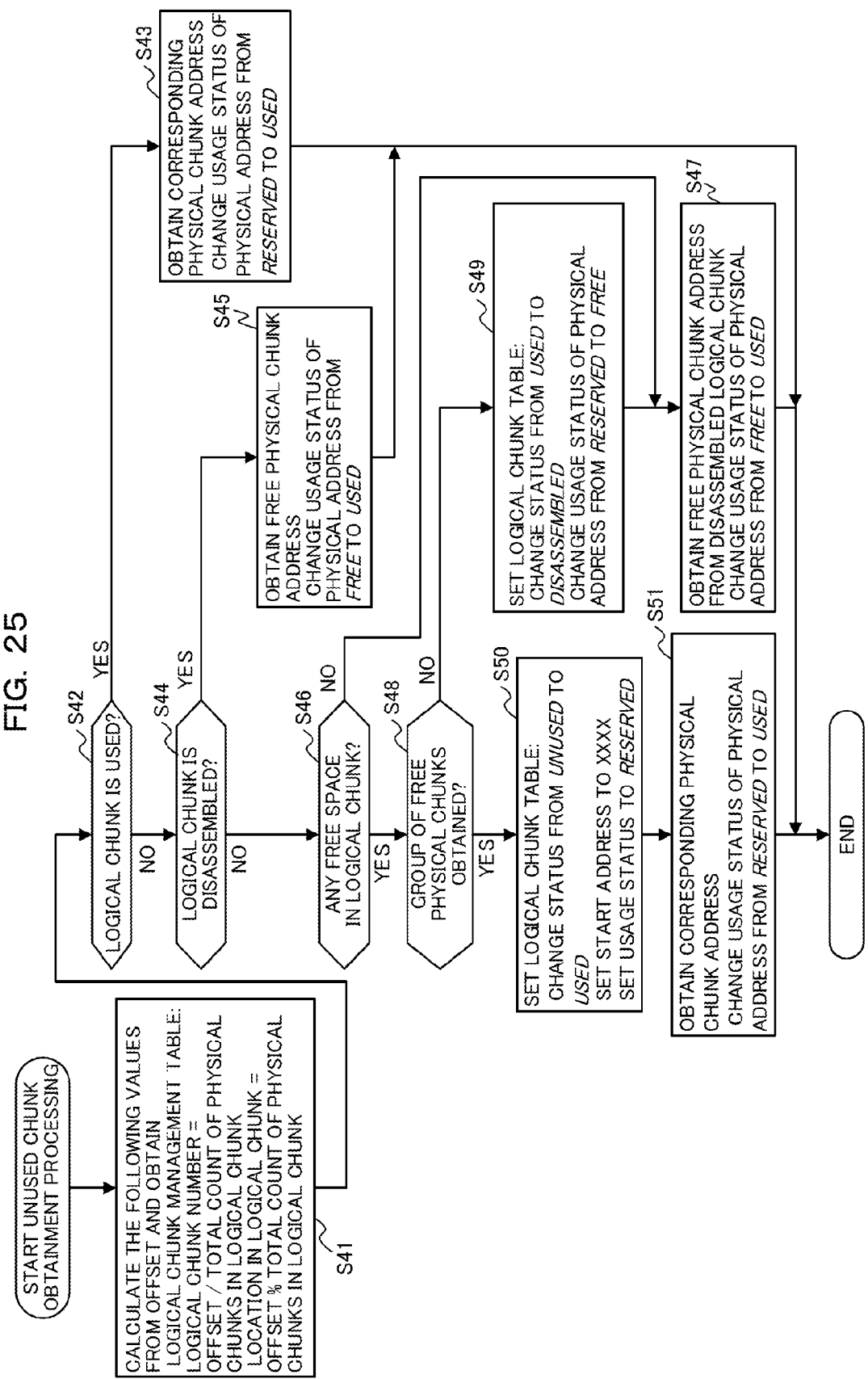
FIG. 25 is a flowchart illustrating one example of processing for obtaining unused chunks by a chunk allocating unit according to the second embodiment.

As depicted in FIG. 25, for example, the chunk allocating unit 23B divides the offset with the number of physical chunks in the logical chunk 20c to obtain the result (quotient) of the division, as the logical chunk number. Furthermore, the chunk allocating unit 23B divides the offset with the number of physical chunks in the logical chunk 20c to obtain another (remainder) result of the division, as the location in the logical chunk (Step S41).

Note that the logical chunk number is the number for identifying each logical chunk 20c, and the location in the logical chunk is the information for identifying the location of that chunk 20a within the logical chunk 20c. The logical chunk number and the location in the logical chunk are set by the logical chunk management unit 27.

The chunk allocating unit 23B then determines whether or not the status of the identified logical chunk 20c is "Used", based on the logical chunk management table 26a (Step S42). If it is "Used" (YES route from Step S42), the chunk allocating unit 23B obtains the address of the corresponding physical chunk, and allocates it to the acquired write address. Furthermore, the logical chunk management unit 27 changes the usage status of the physical address from "Reserved" to "Used" (Step S43), and the processing ends.

Otherwise, if the logical chunk 20c is not "Used" in Step S42 (NO route from Step S42), the chunk allocating unit 23B determines whether or not the status of the logical chunk 20c is "Disassembled" (Step S44). If the status is "Disassembled" (YES route from Step S44), that logical chunk 20c had a low usage ratio and hence has been disassembled. Thus, the chunk allocating unit 23B obtains the address of one of free physical chunks from all of the logical chunks 20c, and allocates it to the write address. The logical chunk management unit 27 also changes the usage status of that physical address from "Free" to "Used" (Step S45), and the processing ends.

If the logical chunk 20c is not "Disassembled" in Step S44 (NO route from Step S44), the chunk allocating unit 23B obtains a new chunk 20a (logical chunk 20c) for the write address. For example, the chunk allocating unit 23B determines whether or not there is any "Free" in the status of the logical chunk 20c (Step S46). If there is no free (the statuses of all logical chunks 20c are "No free") (NO route from Step S46), all of the logical chunks 20c are "Used" or "Disassembled". Thus, the chunk allocating unit 23B obtains the address of one of free physical chunks of disassembled logical chunks from all of the logical chunks 20c, and allocates it to the write address. The logical chunk management unit 27 also changes the usage status of that physical address from "Free" to "Used" (Step S47), and the processing ends.

The address of the free physical chunks from all or disassembled logical chunks 20c in Step S45 or S47 may be obtained by obtaining any of physical chunks, or may be obtained using the technique of the first embodiment. More specifically, a physical chunk may be obtained from the logical chunk 20c, of which allocation range of the virtual addresses of the logical chunk 20c is the closest to the write address (offset), in the same manner as the chunk allocating unit 23A in the first embodiment. In this case, the memory 2b in the management server 2 may include a pool (logical chunk) management table 21b for the logical chunks 20c.

If there is any free logical chunk 20*c* (there is any logical chunk 20*c* whose status is not "No free") in Step S46 (YES route from Step S46), the chunk allocating unit 23B uses that free logical chunk 20*c*, or disassembles an used logical chunk 20*c* and uses one chunk. For example, the chunk allocating unit 23B attempts to obtain a free chunk group (free logical chunks 20*c*), and determines whether or not any free chunk group is obtained (Step S48).

If no free chunk group can be obtained (YES route from Step S48), the chunk allocating unit 23B disassembles a logical chunk 20*c* which has the smallest usage ratio of the chunk 20*a*, among used logical chunks 20*c* among all of the logical chunks 20*c*. For example, the chunk allocating unit 23B checks the bitmap 26*b*, and identifies the logical chunk 20*c* that has the highest ratio of Unused "0". The chunk allocating unit 23B then disassembles the identified logical chunk 20*c* (Step S49), and the flow moves to Step S47. Note that, in the disassemble processing, the logical chunk management unit 27 changes the status in the logical chunk management table 26*a* from "Used" to "Disassembled", and changes the usage statuses of the physical addresses in that logical chunk 20*c* from "Reserved" to "Free".

Otherwise, if a free physical chunk can be obtained in Step S48 (YES route from Step S48), the logical chunk management unit 27 changes the status in the logical chunk management table 26*a* from "Unused" to "Used". The logical chunk management unit 27 also sets "xxxx", which is the new start physical address of the logical chunk 20*c*, to the start address in the logical chunk management table 26*a*, and sets the usage statuses of the physical addresses to "Reserved" (Step S50).

The chunk allocating unit 23B then obtains the address of the corresponding physical chunk. The logical chunk management unit 27 also changes the usage status of the physical address in the logical chunk management table 26*a* from "Reserved" to "Used" (Step S51), and the processing ends. This is the end of the processing for obtaining an unused chunk 20*a* by the chunk allocating unit 23B (and the logical chunk management unit 27).

As set forth above, in accordance with the management server 2 according to the second embodiment, physically continuous multiple chunks 20*a* are handled as a logical chunk 20*c*. As a result, the management server 2 according to the second embodiment can control such that, for sequential virtual addresses in a logical chunk 20*c*, the physical addresses of differential data are also arranged continuously in a physical disk 10.

Figure 26:
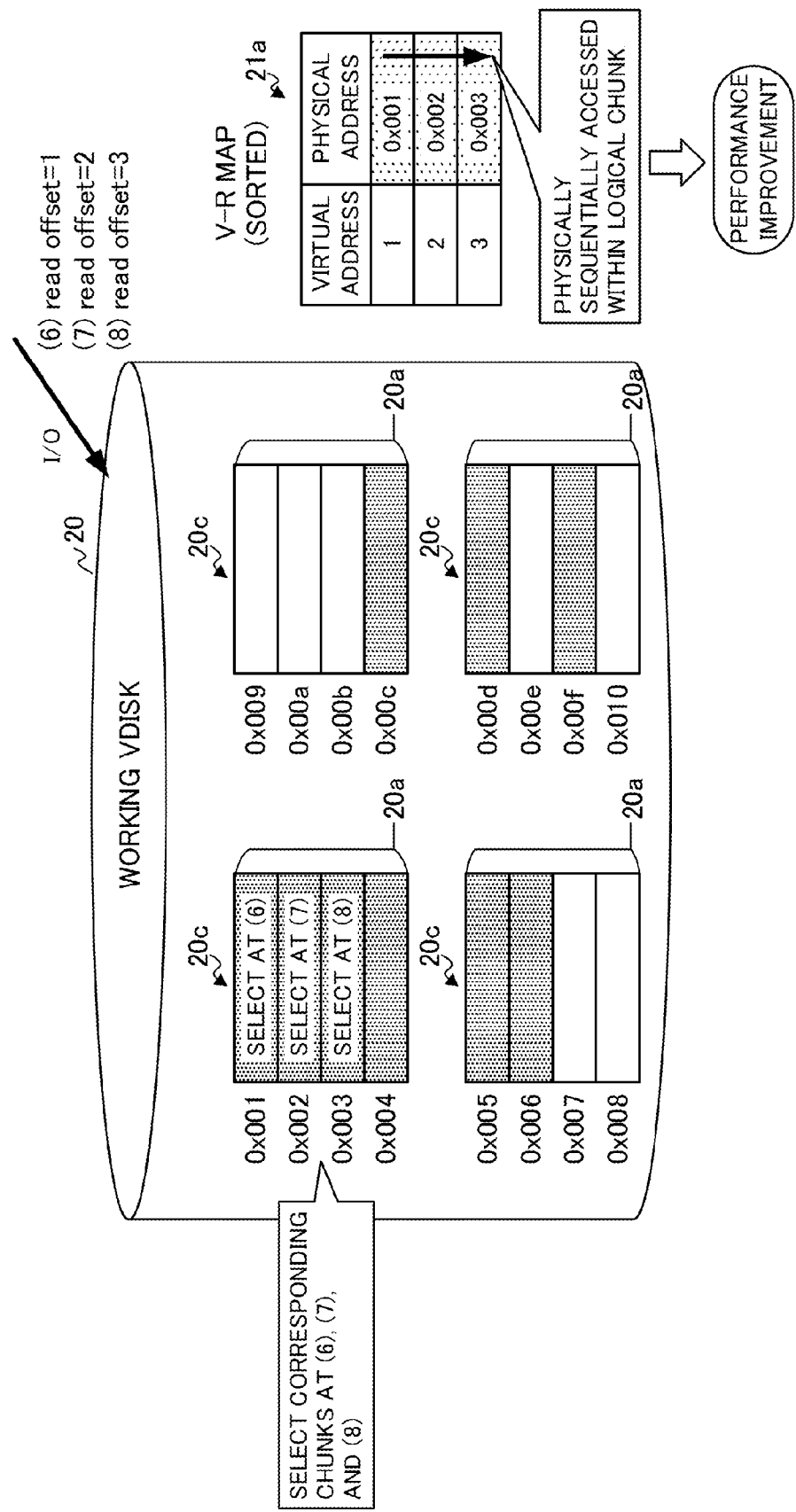
FIG. 26 is a diagram illustrating an example where sequential read I/Os are made in FIG. 22.

For example, after the random write I/Os depicted in FIG. 22, it is assumed that sequential read I/Os are to be executed for the offsets "1", "2", and "3", in this order (see FIG. 26). In this case, pieces of data to be read are arranged continuously in a physical disk 10, in the logical chunk 20*c*. In other words, in accordance with the management server 2 according to the second embodiment, even when virtual addresses are randomly received for random write I/Os (accesses), sequential physical addresses can be allocated to the sequential virtual addresses in an efficient manner. Hence, the seek time within the physical disks 10 are reduced, and the access performances are improved.

As described above, in addition providing the same effects as those of the first embodiment, the management server 2 according to the second embodiment is advantageous in that sequential allocation of data are possible in real time, and the access performance is improved in real time, as compared to other techniques where data are rearranged at later time, such as defrag.

As set forth above, the logical chunk management unit 27 can represent one example of a processor that executes a process to define, in the physical area, a continuous area having a plurality of continuous physical addresses, and define, based on a virtual address to which a physical address in the continuous area has initially been allocated, an allocation range of virtual addresses for allocating the determined continuous area. Furthermore, the chunk allocating unit 23B can represent one example of the processor that executes a process to allocate a physical address in the defined continuous area, to a virtual address in the defined allocation range.

(3-1) Modification to Second Embodiment

In the management server 2 according to the second embodiment, physically continuous multiple chunks 20*a* are handled in a logical chunk 20*c*. For further enhancing the advantageous effect of the performance improvement, it is desirable that differential data is written to all chunks 20*a* within a logical chunk 20*c*. This is because, when a sequential read I/O is performed to a logical chunk 20*c* having any missing chunks 20*a*, data of those missing chunks 20*a* is read from the master VDISK 20 and thus the access performance is reduced.

For example, in a modification to the second embodiment, the chunk allocating unit 23B in the management server 2 may check the usage ratio of chunks 20*a* within a logical chunks 20*c*, at a certain time interval (predetermined timing). Furthermore, if the usage ratio of a logical chunks 20*c* becomes equal to or more than a threshold (e.g., 75%), for "Reserved" chunks 20*a* in that logical chunks 20*c*, the chunk allocating unit 23B may read corresponding data from the master VDISK 20, and write (supplement) it to the "Reserved" chunks 20*a*, as differential data.

Figure 27:
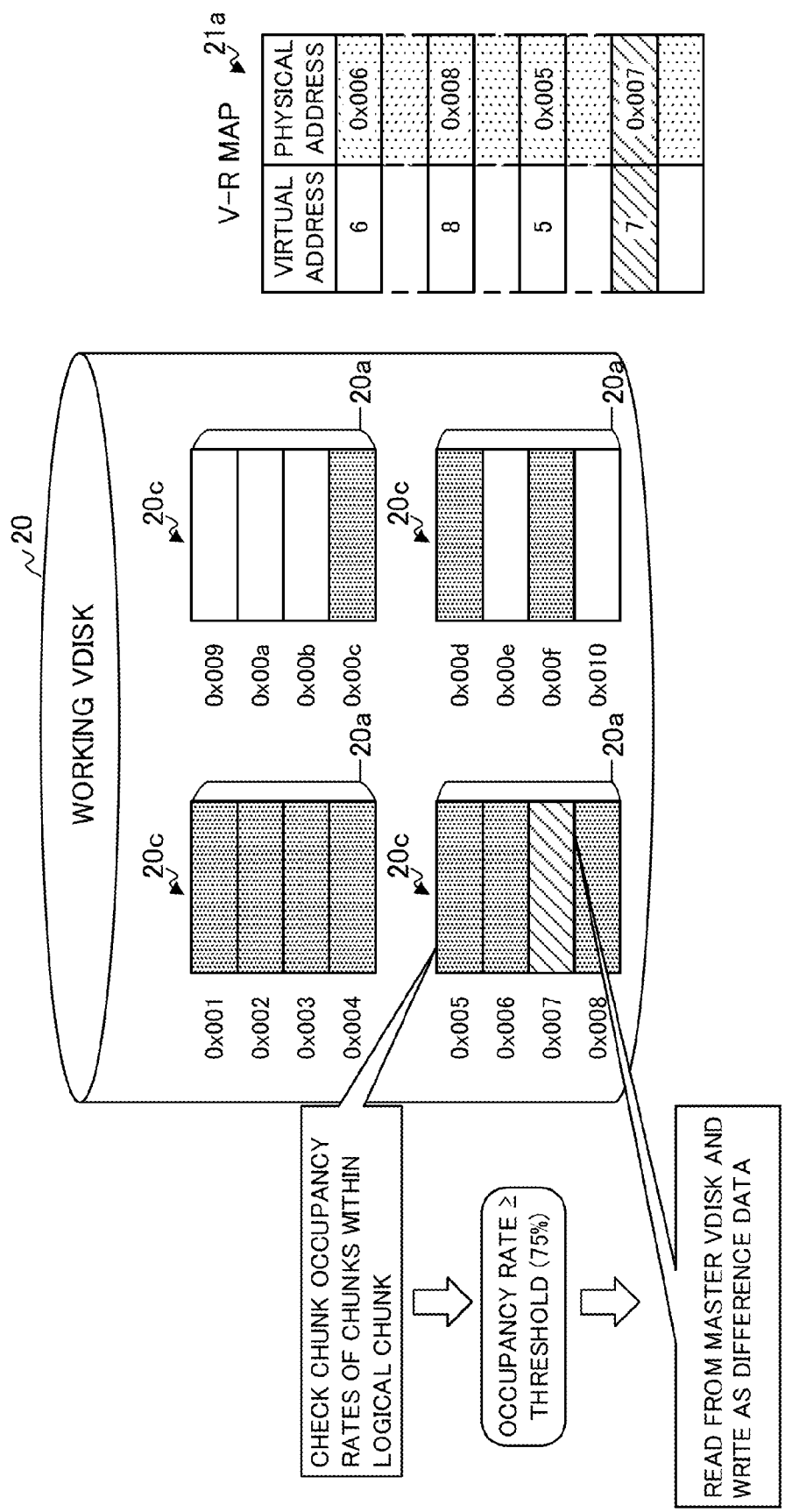
FIG. 27 is a diagram illustrating an example where free chunks in a logical chunk are supplemented in FIG. 22.

For example, as depicted in FIG. 27, the chunk allocating unit 23B checks the usage ratio of chunks 20*a* in the logical chunks 20*c* at a certain time interval (e.g., from several minutes to several hours). If the chunks 20*a* other than the chunk "0x007" are all "Used" in the logical chunk 20*c* ranging from "0x005" to "0x008", the chunk allocating unit 23B determines that the usage ratio of that logical chunk 20*c* is equal to or higher than 75% (i.e., threshold). The chunk allocating unit 23B can then read corresponding data for the "Reserved" chunk 20*a* with an index of "0x007", from the master VDISK 20, for supplementing the chunk 20*a* "0x007" on the working VDISK 20.

As described above, in addition providing the same effects as those of the second embodiment, the modification to the second embodiment is advantageous in that data of any missing chunk 20*a* in a logical chunk 20*c* can be supplemented. Thus, the access performance of sequential read I/Os can be further improved.

(4) Example Hardware Configuration

Figure 28:
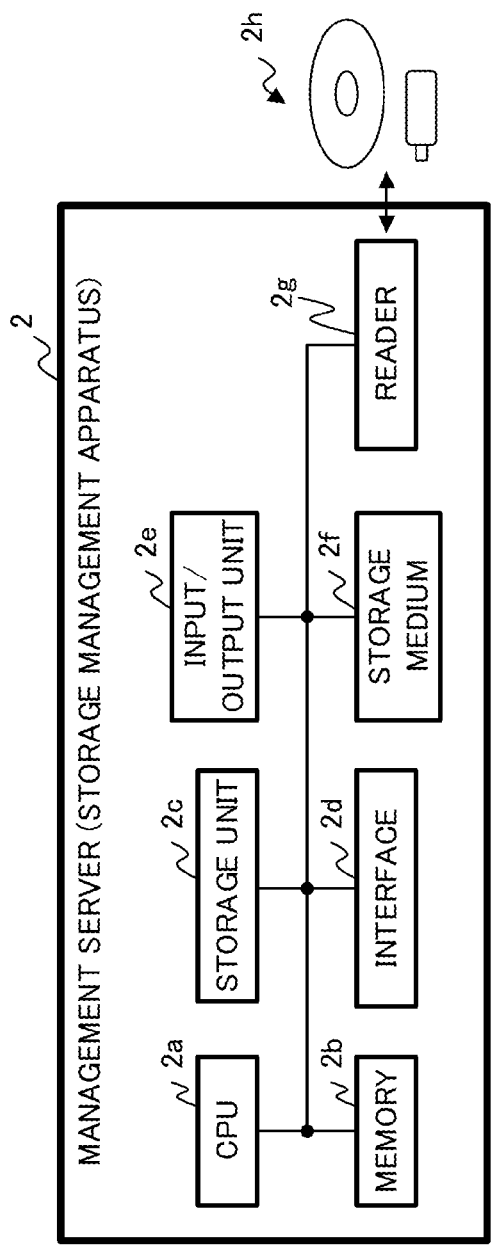
FIG. 28 is a diagram illustrating an example hardware configuration of the management server depicted in FIG. 3.
Figure 29:
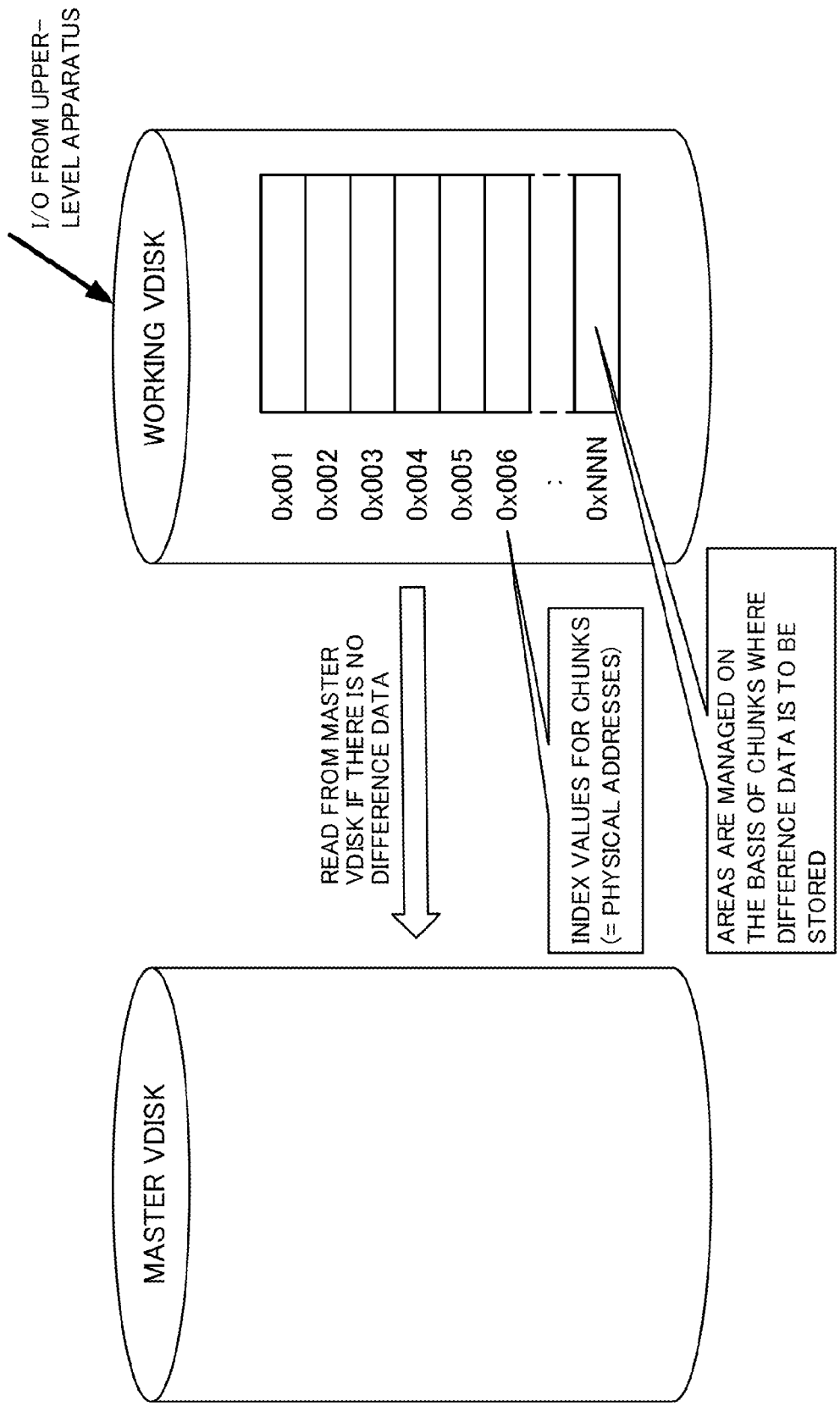
FIG. 29 is a diagram illustrating an example of how areas of a snapshot are administered.
Figure 30:
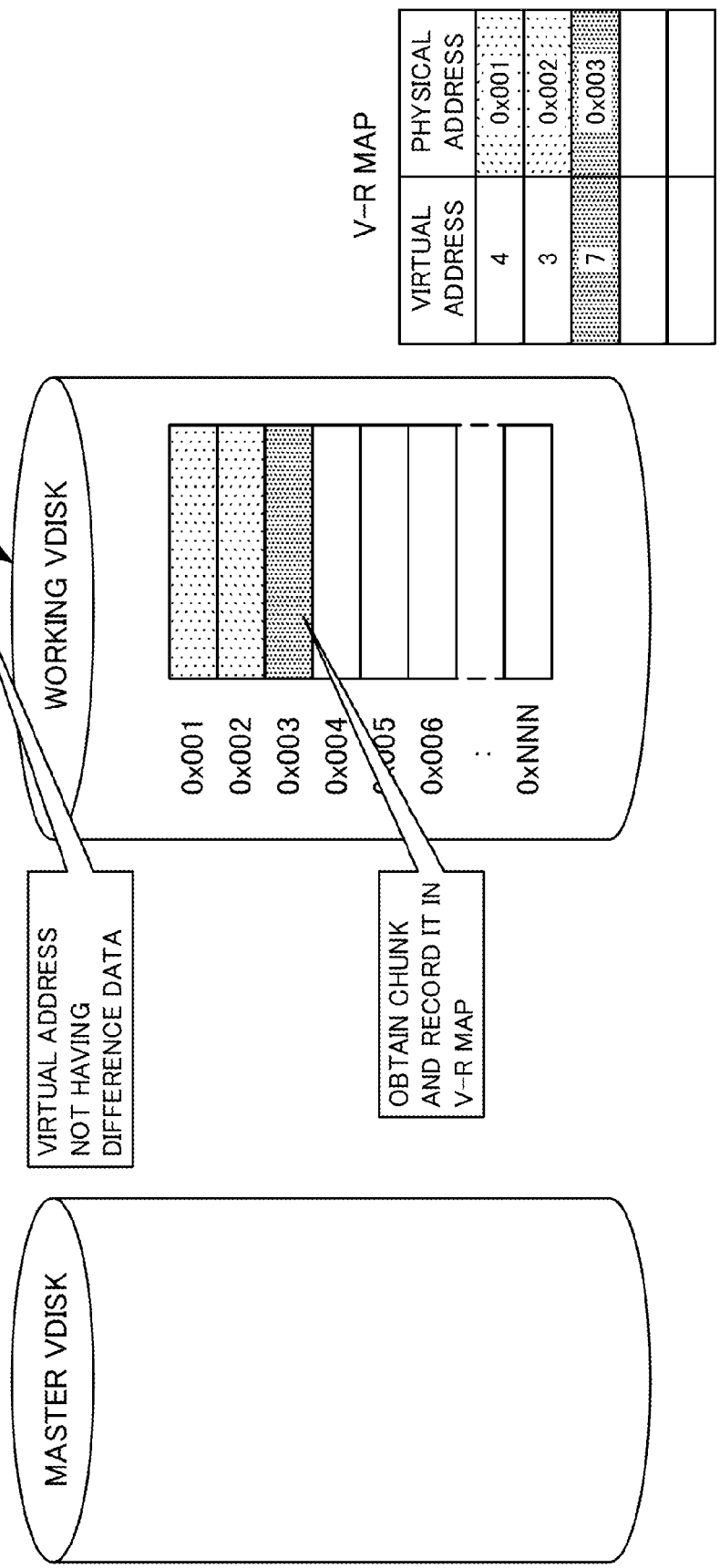
FIG. 30 is a diagram illustrating an example where a first write I/O is made in FIG. 29.
Figure 31:
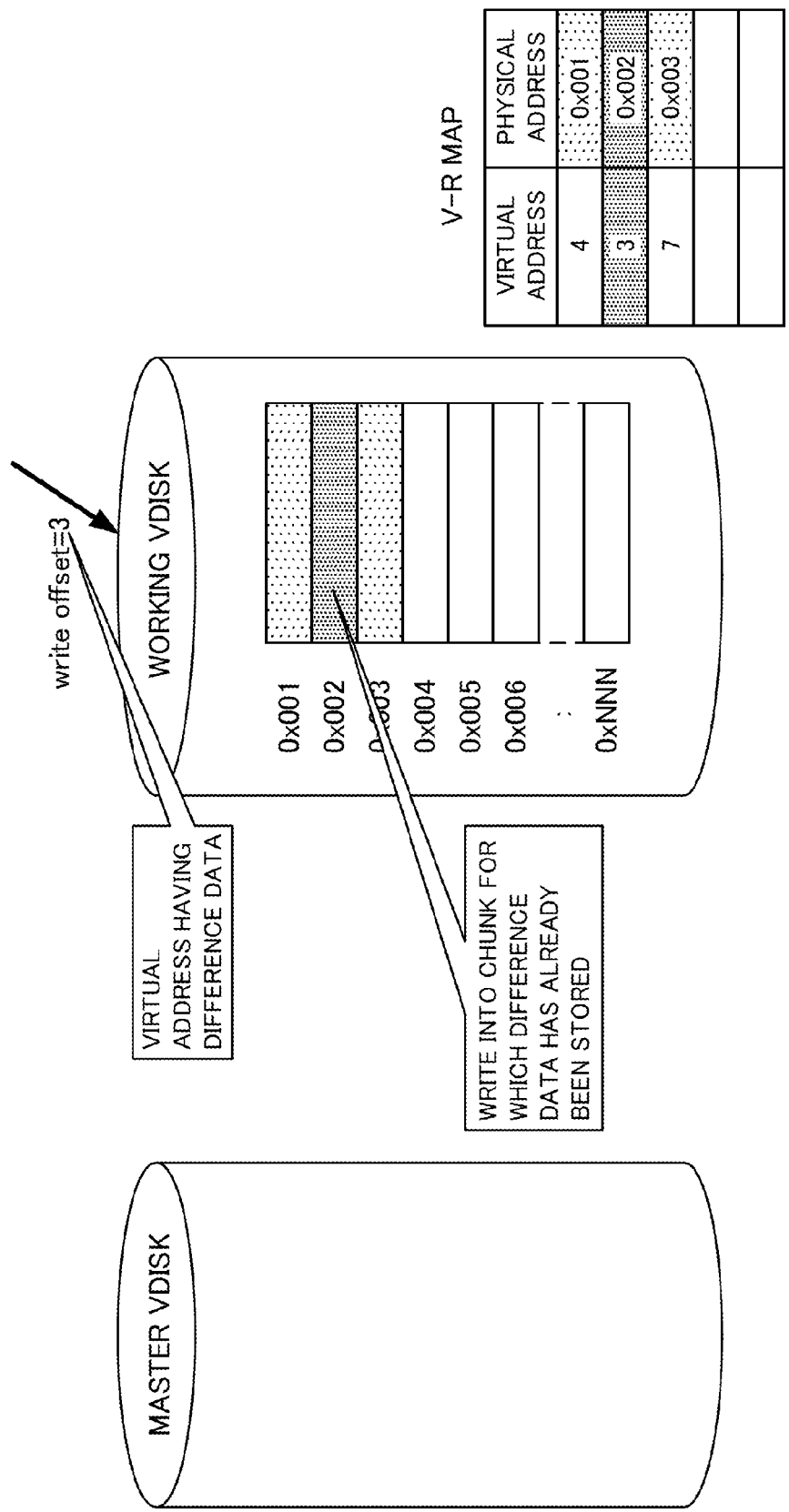
FIG. 31 is a diagram illustrating an example where a second or subsequent write I/O is made in FIG. 29.

As depicted in FIG. 28, the management server 2 according to the first and second embodiments and the modifications thereto may include a CPU 2*a*, a memory 2*b*, a storage unit 2*c*, an interface 2*d*, an input/output unit 2*e*, a storage medium 2*f*, and a reader 2*g*.

The CPU 2*a* represents one example of an information processing unit (processor) that performs various types of controls and computations. The CPU 2*a* is connected to the corresponding blocks 2*b* to 2*g*, and can embody various functions by executing a program stored in the memory 2*b*, the storage unit 2*c*, the storage media (recording medium) 2*f* and 2h, or a read only memory (ROM) that is not illustrated. For example, The CPU 2a can embody functions of the management server 2 (see FIG. 3), by executing the management program 21c (storage management program) stored in the memory 2b.

The memory 2b is a storage unit that stores various types of data and programs. When a program is executed, the CPU 2a stores and retains data and programs in the memory 2b. The memory 2b can retain the above-described management program 21c. Note that the memory 2b may be a volatile memory, such as a RAM, for example. The storage unit 2c is hardware that stores various types of data and programs. The storage unit 2c may be a magnetic disk device, such as a HDD, a solid state drive device, such as an SSD, and a non-volatile memory, such as a flush memory, for example. Note that the physical disks 10 in the RAID apparatuses 1 depicted in FIG. 3 may be embodied by the storage unit 2c.

The interface 2d is configured to control wired or wireless connections and communications with a network (e.g., the network 3) or other information processing apparatus, or the RAID apparatuses 1, or the like. The interface 2d may be an adaptor compliant with a local area network (LAN), the Fibre Channel (FC), the InfiniBand standards, for example. The input/output unit 2e may include at least one of an input device, such as mouse and a key, or an output device, such as a display and a printer. For example, the input device may be used by an administrator or any other users to enter various types of settings and data to the management server 2. The output device may be used for outputting operation statuses and processing results by the management server 2.

The storage medium 2f is a storage unit, such as a flush memory or an ROM, which stores various types of data and programs. The reader 2g is a device that reads data and programs stored in the computer-readable storage medium (recording medium) 2h. At least one of the storage media 2f and 2h may store the management program 21c that embodies all or a part of functions of the management server 2 according to the present embodiments. For example, the CPU 2a may copy the management program 21c read from the storage medium 2f or the management program 21c read from the storage medium 2h using the reader 2g, into a storage unit, such as the memory 2b, for executing it.

The storage medium 2h may be a flexible disk; a compact disc (CD); a digital versatile disc (DVD); an optical disk, such as a Blu-ray disc; a flush memory, such as a universal serial bus (USB) memory or an SD card, for example. Examples of the CD include a CD-ROM, a CD-Recordable (CD-R), a CD-Rewritable (CD-RW). Furthermore, examples of the DVD may include a DVD-ROM, a DVD-RAM, a DVD-R, a DVD-RW, a DVD+R, and DVD+RW.

The above-described blocks 2a to 2g are communicatively connected to each other via a bus. Furthermore, the above-described hardware configuration of the management server 2 is merely exemplary. Thus, any hardware of the management server 2 may be added or omitted (e.g., any of the blocks may be added or deleted); or any of the components may be divided or combined; or a bus may be added or omitted, for example.

(5) Miscellaneous

Although the preferred embodiments of the present disclosure have been described, the present disclosure is not limited to those particular embodiments, and various modifications and variations may be possible, without departing from the spirit of the present disclosure.

For example, any of the functional blocks in the management server 2 depicted in FIGS. 3, 4, 13, 16, and 19 may be combined or divided. Furthermore, each storage system may be provided with one RAID apparatuses 1 and one business server 4.

Furthermore, the size of the chunks 20a, the numbers of chunks 20a included in a pool 20b and a logical chunk 20c, the allocation range of the virtual addresses in a pool 20b, or the like, in the embodiments and the modifications thereto, are merely exemplary and those values may be varied.

In accordance with an embodiment, when virtual addresses of a virtual storage area to which data is to be stored are allocated to physical addresses of physical storage areas, a deterioration of the access performance to the virtual storage areas can be suppressed.

All examples and conditional language recited provided herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A storage management apparatus comprising a processor configured to:
   define, in a physical storage area to be allocated to a virtual storage area for storing data, a continuous area having a plurality of continuous physical addresses;
   allocate, in response to a write access to a virtual address which has not been allocated to a physical address, the virtual address to one of the physical addresses in the defined continuous area, the allocating being a first time allocation in the defined continuous area;
   define, based on the allocated virtual address, an allocation range of virtual addresses for allocating the defined continuous area; and
   allocate a physical address in the defined continuous area to a virtual address in the defined allocation range.

2. The storage management apparatus according to claim 1, wherein the processor further executes a process to allocate a physical address in a different continuous area, to a virtual address outside the defined allocation range.

3. The storage management apparatus according to claim 2, wherein the processor further executes a process to update, upon allocating a physical address in the defined continuous area to a virtual address in the defined allocation range after defining the allocation range of virtual addresses for allocating the defined continuous area, the allocation range of virtual addresses for allocating the continuous area, based on the allocated virtual address.

4. The storage management apparatus according to claim 1, wherein the processor further executes a process to, when there are a plurality of continuous areas corresponding to a virtual address that is to be allocated, select a continuous area which is allocated to a virtual address having a smallest address difference from the virtual address to be allocated, among virtual addresses corresponding to the plurality of continuous areas.

5. The storage management apparatus according to claim 1, wherein the processor further executes a process to change a relationship of allocation between virtual addresses having been allocated to the continuous area and the physical addresses in the continuous area such that an order of the physical addresses in the continuous area become a given order when the virtual addresses which have been allocated to the continuous area are sorted into the given order.

6. The storage management apparatus according to claim 1, wherein the processor further executes a process to determine a physical address corresponding to a virtual address that is to be allocated, and another physical address that is reserved for another virtual address, based on the number of physical addresses included in the continuous area.

7. The storage management apparatus according to claim 6, wherein the processor further executes a process to
reserve continuous physical addresses in the continuous area, such that an order of the physical addresses in the continuous area become a given order when virtual addresses continuous to a virtual address which has been allocated to the continuous area is sorted into the given order; and
allocate, upon allocating a physical address to a virtual address corresponding to the reserved physical address, the reserved physical address to the virtual address.

8. The storage management apparatus according to claim 6, wherein the processor further executes a process to write supplementary data, for a reserved physical address which has not been allocated to any virtual address in a continuous area in which a lot of physical addresses have already been allocated, and change a status of the reserved physical address from a reserved status to an already-allocated state, the supplementary data being relevant to a virtual address which corresponds to the physical address.

9. A non-transitory computer-readable recording medium having stored therein a storage management program for causing a computer to execute a process comprising:
allocating physical addresses in a physical storage area, to virtual addresses in a virtual storage area for storing data;
defining, in the physical storage area, a continuous area having a plurality of continuous physical addresses;
allocating, in response to a write access to a virtual address which has not been allocated to a physical address, the virtual address to one of the physical addresses in the defined continuous area, the allocating being a first time allocation in the defined continuous area;
defining, based on the allocated virtual address, an allocation range of virtual addresses for allocating the defined continuous area; and
allocating a physical address in the defined continuous area to a virtual address in the defined allocation range.

10. The non-transitory computer-readable recording medium according to claim 9, wherein the storage management program causes the computer to execute the process further comprising allocating a physical address in a different continuous area, to a virtual address outside the defined allocation range.

11. The non-transitory computer-readable recording medium according to claim 10, wherein the storage management program causes the computer to execute the process further comprising updating, upon allocating a physical address in the defined continuous area to a virtual address in the defined allocation range after defining the allocation range of virtual addresses for allocating the defined continuous area, the allocation range of virtual addresses for allocating the continuous area, based on the allocated virtual address.

12. The non-transitory computer-readable recording medium according to claim 9, wherein the storage management program causes the computer to execute the process further comprising, when there are a plurality of continuous areas corresponding to a virtual address that is to be allocated, selecting a continuous area which is allocated to a virtual address having a smallest address difference from the virtual address to be allocated, among virtual addresses corresponding to the plurality of continuous areas.

13. The non-transitory computer-readable recording medium according to claim 9, wherein the storage management program causes the computer to execute the process further comprising changing a relationship of allocation between virtual addresses having been allocated to the continuous area and the physical addresses in the continuous area, such that an order of the physical addresses in the continuous area become a given order when the virtual addresses which have been allocated to the continuous area are sorted into the given order.

14. The non-transitory computer-readable recording medium according to claim 9, wherein the storage management program causes the computer to execute the process further comprising determining a physical address corresponding to a virtual address that is to be allocated, and another physical address that is reserved for another virtual address, based on the number of physical addresses included in the continuous area.

15. The non-transitory computer-readable recording medium to claim 14, wherein the storage management program causes the computer to execute the process further comprising:
reserving continuous physical addresses in the continuous area, such that an order of the physical addresses in the continuous area become a given order when virtual addresses continuous to a virtual address which has been allocated to the continuous area is sorted into the given order; and
allocating, upon allocating a physical address to a virtual address corresponding to the reserved physical address, the reserved physical address to the virtual address.

16. The non-transitory computer-readable recording medium according to claim 14, wherein the storage management program causes the computer to execute the process further comprising writing supplementary data, for a reserved physical address which has not been allocated to any virtual address in a continuous area in which a lot of physical addresses have already been allocated, and changing a status of the reserved physical address from a reserved status to an already-allocated state, the supplementary data being relevant to a virtual address which corresponds to the physical address.

17. A control method comprising:
allocating physical addresses in a physical storage area, to virtual addresses in a virtual storage area for storing data;
defining, in the physical storage area, a continuous area having a plurality of continuous physical addresses;
allocating, in response to a write access to a virtual address which has not been allocated to a physical address, the virtual address to one of the physical addresses in the defined continuous area, the allocating being a first time allocation in the defined continuous area;
defining, based on the allocated virtual address, an allocation range of virtual addresses for allocating the defined continuous area; and allocating a physical address in the defined continuous area to a virtual address in the defined allocation range.

18. The control method according to claim 17, further comprising allocating a physical address in a different continuous area, to a virtual address outside the defined allocation range.

19. The control method according to claim 18, further comprising updating, upon allocating a physical address in the defined continuous area to a virtual address in the defined allocation range after defining the allocation range of virtual addresses for allocating the defined continuous area, the allocation range of virtual addresses for allocating the continuous area, based on the allocated virtual address.

20. The control method according to claim 17, further comprising determining a physical address corresponding to a virtual address that is to be allocated, and another physical address that is reserved for another virtual address, based on the number of physical addresses included in the continuous area.

* * * * *